US010065811B2

(12) United States Patent
McCarthy et al.

(10) Patent No.: US 10,065,811 B2
(45) Date of Patent: Sep. 4, 2018

(54) ROBOTIC CARTON UNLOADER WITH INTEGRAL EXTRACTION MECHANISM

(71) Applicant: Intelligrated Headquarters, LLC, Mason, OH (US)

(72) Inventors: Michael Donovan McCarthy, Mason, OH (US); Michael L. Girtman, O'Fallon, MO (US); Thomas Michael Ferner, Lake Saint Louis, MO (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 15/587,549

(22) Filed: May 5, 2017

(65) Prior Publication Data
US 2018/0086575 A1    Mar. 29, 2018

Related U.S. Application Data

(63) Continuation of application No. 15/351,960, filed on Nov. 15, 2016, now Pat. No. 9,738,463.
(Continued)

(51) Int. Cl.
G06F 7/00 (2006.01)
G06F 19/00 (2018.01)
B65G 61/00 (2006.01)
B65G 41/00 (2006.01)
B65G 59/02 (2006.01)
(Continued)

(52) U.S. Cl.
CPC ............ *B65G 61/00* (2013.01); *B25J 9/0093* (2013.01); *B25J 15/0616* (2013.01); *B65G 41/002* (2013.01); *B65G 59/02* (2013.01)

(58) Field of Classification Search
None
See application file for complete search history.

(56) References Cited

U.S. PATENT DOCUMENTS 5,944,469 A    8/1999    Theurer et al.
9,393,686 B1   7/2016    Bradski et al.
(Continued)

FOREIGN PATENT DOCUMENTS

WO    WO-2008/153757 A1    12/2008
WO    WO 2016/033172 A1    3/2016

OTHER PUBLICATIONS

International Search Report and Written Opinion of International Searching Authority for International Patent Application No. PCT/US2016/060635 dated Mar. 7, 2017, 10 pages.
(Continued)

*Primary Examiner* — Yolanda Renee Cumbess
(74) *Attorney, Agent, or Firm* — Alston & Bird LLP

(57) ABSTRACT

A robotic carton unloader for unloading a carton pile resting on a floor includes a mobile body movable across the floor on more than one wheel. A conveyor system mounted on the mobile body conveys unloaded cartons thereon. A robotic arm assembly has a manipulator head attached to a front end of the upper arm assembly. The manipulator head engages at least one carton at a time from a carton pile resting on a floor for movement to the conveyor system. A built-in jacking apparatus is extendable from the mobile body to a floor to raise the mobile body a distance sufficient to raise at least one of the more than one wheel away from contacting the floor.

8 Claims, 22 Drawing Sheets

Related U.S. Application Data

(60) Provisional application No. 62/417,368, filed on Nov. 4, 2016, provisional application No. 62/369,435, filed on Aug. 1, 2016, provisional application No. 62/362,100, filed on Jul. 14, 2016.

(51) Int. Cl.
*B25J 9/00* (2006.01)
*B25J 15/06* (2006.01)

(56) References Cited

U.S. PATENT DOCUMENTS

| | | |
|---|---|---|
| 2002/0094258 A1 | 7/2002 | Iwasaki et al. |
| 2005/0131645 A1 | 6/2005 | Panopoulos |
| 2008/0267756 A1 | 10/2008 | Echelmeyer et al. |
| 2009/0110525 A1 | 4/2009 | Criswell et al. |
| 2015/0063972 A1 | 3/2015 | Girtman et al. |
| 2015/0063973 A1 | 3/2015 | Girtman et al. |
| 2015/0308466 A1 | 10/2015 | Girtman et al. |
| 2016/0016311 A1 | 1/2016 | Konolige et al. |
| 2016/0266578 A1* | 9/2016 | Douglas ............... G05D 1/0225 |
| 2017/0096308 A1 | 4/2017 | Girtman et al. |
| 2017/0107055 A1* | 4/2017 | Magens ................ G05D 1/021 |
| 2017/0248966 A1* | 8/2017 | Lutz .................... G05D 1/0291 |

OTHER PUBLICATIONS

Notice of Allowance for U.S. Appl. No. 15/351,960 dated Apr. 20, 2017, 10 pages.
Office Action for U.S. Appl. No. 15/344,183 dated Sep. 21, 2017, 6 pages.
International Search Report and Written Opinion for Application No. PCT/US2017/042033 dated Oct. 27, 2017, 10 pages.
International Search Report and Written Opinion for Application No. PCT/US2017/042031 dated Nov. 11, 2017, 10 pages.

* cited by examiner

ROBOTIC CARTON UNLOADER WITH INTEGRAL EXTRACTION MECHANISM

CLAIMS OF PRIORITY AND CROSS-REFERENCE TO RELATED APPLICATIONS

This application is a continuation of U.S. patent application Ser. No. 15/351,960 application filed 15 Nov. 2016, entitled "Autonomous Controls for a Robotic Carton Unloader", which in turn claims the benefit of U.S. Provisional Patent Application Ser. No. 62/362,100 filed 14 Jul. 2016, entitled "Autonomous Controls for a Robotic Carton Unloader", U.S. Provisional Patent Application Ser. No. 62/369,435 filed 1 Aug. 2016, entitled "Autonomous Controls for a Robotic Carton Unloader", and U.S. Provisional Patent Application Ser. No. 62/417,368 filed 4 Nov. 2016, entitled "Conveyor Screening During Robotic Article Unloading", assigned to the assignee, the disclosures of which are hereby incorporated by reference in its entirety.

BACKGROUND

1. Technical Field

The present disclosure generally relates to article unloading systems, and more specifically to autonomous unloading system that can enter and unload unpalletized cartons from a carton pile within confined space such as a shipping container or truck trailer.

2. Description of the Related Art

Trucks and trailers loaded with cargo and products move across the country to deliver products to commercial loading and unloading docks at stores, warehouses, and distribution centers. Trucks can have a trailer mounted on the truck, or can be of a tractor-semi trailer configuration. To lower overhead costs at retail stores, in-store product counts have been reduced, and products-in-transit now count as part of available store stock. Unloading trucks quickly at the unloading docks of warehouses and regional distribution centers has attained new prominence as a way to refill depleted stock.

Trucks are typically unloaded with forklifts if the loads are palletized and with manual labor if the products are stacked within the trucks. Unloading large truck shipments manually with human laborers can be physically difficult, and can be costly due to the time and labor involved. Consequently, a need exists for an improved unloading system that can unload bulk quantities of stacked cases and cargo from truck trailers more quickly than human laborers and at a reduced cost. However, an autonomous unloading system can be very heavy. With use in trailers or shipping containers of varying quality and age, a risk exists that a truck unloader could become stuck in a damaged floor.

BRIEF SUMMARY

In one aspect, the present disclosure provides a robotic carton unloader for unloading a carton pile resting on a floor. The robotic carton unloader has a mobile body movable across the floor. A conveyor system is mounted on the mobile body to convey unloaded cartons placed thereon by a robotic arm assembly. Right and left lower arms of the robotic arm assembly are pivotally attached at a lower end respectively to the mobile body on opposing lateral sides of the conveyor system passing there between. The right and left lower arms rotate about a lower arm axis that is perpendicular to a longitudinal axis of the conveyor system. An upper arm assembly has a rear end pivotally attached at an upper end respectively of the right and left lower arms to pivotally rotate about an upper arm axis that is perpendicular to the longitudinal axis of the conveyor system and parallel to the lower arm axis. A manipulator head is attached to a front end of the upper arm assembly and engages at least one carton at a time from a carton pile resting on a floor for movement to the conveyor system. The pivotal movement of the right and left lower arms maintains the upper arm axis at a height that enables the at least one carton to be conveyed by the conveyor system without being impeded by the robotic arm assembly as soon as the manipulator head is clear. In one or more embodiments, the robotic carton unloader includes a lift attached between the mobile body and a front portion of the conveyor system. The lift moves the front portion of the conveyor system relative to the floor to reduce spacing underneath the at least one carton during movement from the carton pile to the conveyor system. A built-in jacking apparatus is extendable from the mobile body to a floor to raise the mobile body a distance sufficient to raise at least one of the more than one wheel away from contacting the floor.

In another aspect, the present disclosure provides robotic carton unloader for unloading a carton pile resting on a floor. The robotic carton unloader includes a mobile body movable across the floor on more than one wheel. A conveyor system mounted on the mobile body conveys unloaded cartons thereon. A robotic arm assembly has a manipulator head attached to a front end of the upper arm assembly. The manipulator head engages at least one carton at a time from a carton pile resting on a floor for movement to the conveyor system. A built-in jacking apparatus is extendable from the mobile body to a floor to raise the mobile body a distance sufficient to raise at least one of the more than one wheel away from contacting the floor.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
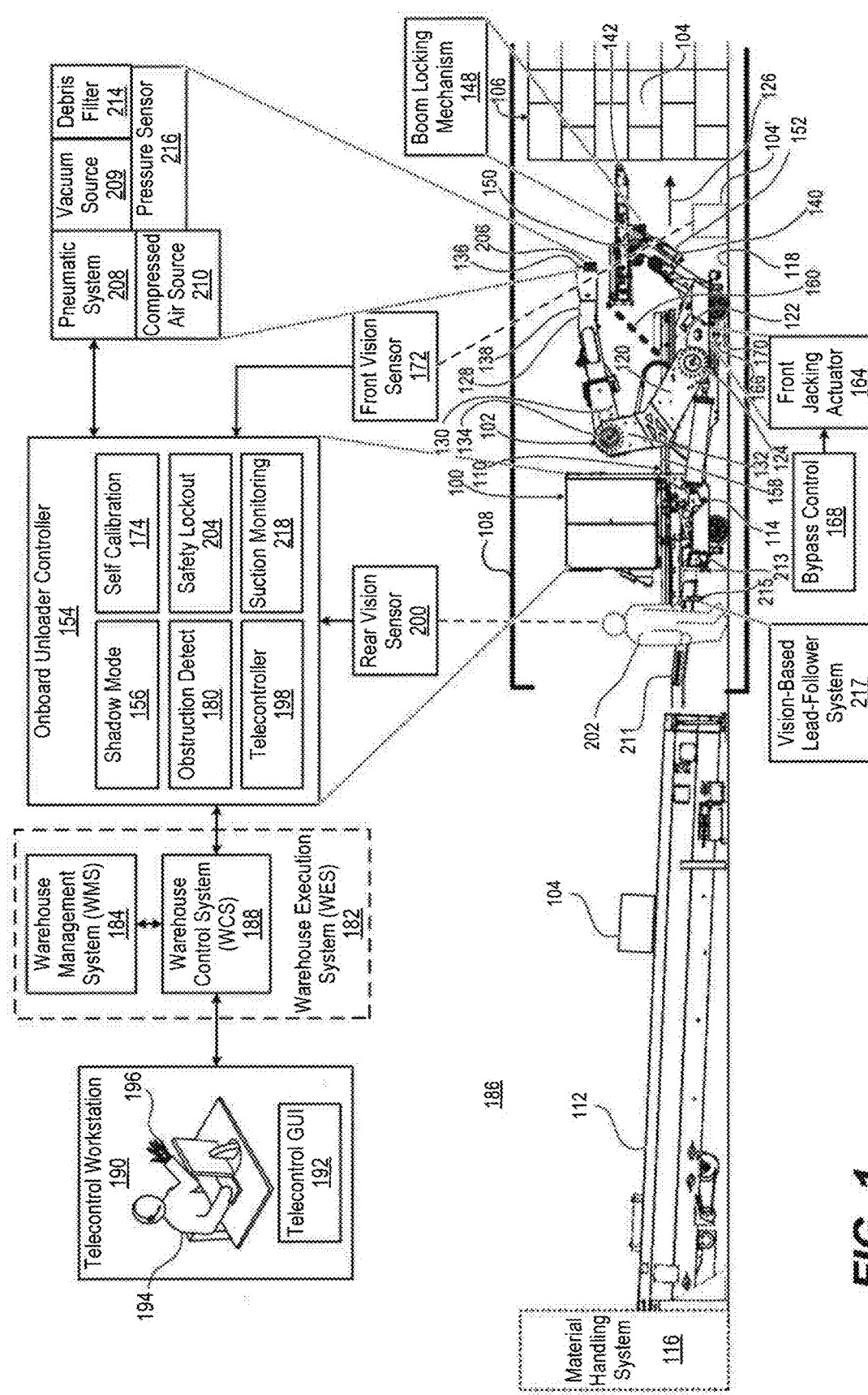
FIG. 1 illustrates a side view with functional block diagram of a robotic carton unloader and extendable conveyor unloading cartons from within a carton pile container, according to one or more embodiments.

Robotic carton unloader has right and left lower arms of robotic arm assembly that are pivotally attached at lower end respectively to mobile body on opposing lateral sides of conveyor system passing there between. Upper arm assembly has rear end pivotally attached at upper end respectively of right and left lower arms to pivotally rotate about upper arm axis perpendicular to longitudinal axis of conveyor system and parallel to lower arm axis. Manipulator head attached to front end of upper arm assembly engages carton/s from carton pile resting on floor for movement to conveyor system. Upper arm axis is maintained at a height that enables carton/s to be conveyed by conveyor system without being impeded by robotic arm assembly as soon as manipulator head is clear. Lift attached between mobile body and front portion of conveyor system reduces spacing underneath carton/s during movement from carton pile to conveyor system.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a robotic carton unloader 100 having a robotic arm assembly 102 unloads cartons 104 from a carton pile 106 inside of a carton pile container 108, such as a trailer, shipping container, storage unit, etc. Robotic arm assembly 102 places the cartons 104 onto a conveyor system 110 of the robotic carton unloader 100 that conveys the cartons 104 back to an extendable conveyor 112 that follows a mobile body 114 of the robotic carton unloader 100 into the carton pile container 108. The extendable conveyor 112 in turn conveys the cartons 104 to a material handling system 116 such as in a warehouse, store, distribution center, etc.

In one or more embodiments, the robotic carton unloader 100 autonomously unloads a carton pile 106 resting on a floor 118 of the carton pile container 108. The mobile body 114 is self-propelled and movable across the floor 118 from outside to the innermost portion of the carton pile container 108. Right and left lower arms 120 of the robotic arm assembly 102 are pivotally attached at a lower end 122 respectively to the mobile body 114 on opposing lateral sides of the conveyor system 110 passing there between. The right and left lower arms 120 rotate about a lower arm axis 124 that is perpendicular to a longitudinal axis 126 of the conveyor system 110. An upper arm assembly 128 of the robotic arm assembly 102 has a rear end 130 pivotally attached at an upper end 132 respectively of the right and left lower arms 120 to pivotally rotate about an upper arm axis 134 that is perpendicular to the longitudinal axis 126 of the conveyor system 110 and parallel to the lower arm axis 124. A manipulator head 136 is attached to a front end 138 of the upper arm assembly 128 and engages at least one carton 104 at a time from the carton pile 106 resting on the floor 118 for movement to the conveyor system 110. The pivotal and simultaneous mirrored movement of the right and left lower arms 120 maintains the upper arm axis 134 at a relative height above the conveyor system 110 that enables the at least one carton 104 to be conveyed by the conveyor system 110 without being impeded by the robotic arm assembly 102 as soon as the manipulator head 136 is clear.

In one or more embodiments, the robotic carton unloader 100 includes a lift 140 attached between the mobile body 114 and a front portion 142 of the conveyor system 110. The lift 140 moves the front portion 142 of the conveyor system 110 relative to the floor 118 to reduce spacing underneath the at least one carton 104 during movement from the carton pile 106 to the conveyor system 110. The lift 140 has a telescoping beam 144 having a drive member 146 that actuates to extend and retract the telescoping beam 144. The drive member 146 can have a failure mode that allows the telescoping beam 144 to retract. A locking boom mechanism 148 is responsive to the failure mode of the drive member 146 to at least slow a rate of retraction of the telescoping beam 144.

In one or more embodiments, the telescoping beam 144 can be pivotally attached to the front portion 142 of the conveyor system 110 for rotation about a front axis 150 that is transverse to the longitudinal axis of the conveyor system and parallel to the lower and upper arm axes. A pivot actuator 152 is attached between the telescoping beam 144 and the front portion 142 of the conveyor system 110. An onboard unloader controller 154 is in communication with the pivot actuator 152, the drive member 146, and the robotic arm assembly 102. The controller 154 executes instructions for a shadow mode module 156 to position a vertical height and pitch of the front portion 142 of the conveyor system 110 to parallel the manipulator head 136 when moving carton/s 104.

In one or more embodiments, the controller 156 retracts the front portion 142 of the conveyor system 110 to convey the received carton/s 104 to a rear portion 158 of the conveyor system 110. In one or more embodiments, a transition carton guiding structure such as a transition belt 160 is attached between the front portion 142 and a rear portion 158 of the conveyor system 110. The transition belt 160 adjusts in length and pitch in response to movement of the lift 140 and conveys carton/s 104 from the front portion 142 to the rear portion 158 with having to retract the lift 140 to increase throughput of the robotic carton unloader 100.

In one or more embodiments, the mobile body 114 of the robotic carton unloader 100 is supported on steerable wheels 162. In the event that power is unavailable to control or drive the steerable wheels 162, a front jacking actuator 164 can extend a built-in jacking apparatus 166 that raises mobile body 114 a distance sufficient to raise at least one steerable wheel 162 away from contacting the floor 118. The front jacking actuator 164 receives control and power from a bypass control 168 that is independent of the controls and power provided to the mobile body 114 and robotic arm assembly 102. The bypass control 168 can be mechanical, electrical, pneumatic, hydraulic, etc. The built-in jacking apparatus 166 can have a lower end 170 with a skid surface or a rolling surface. The built-in jacking apparatus 166 can also be used to raise the mobile body 114 in the event that a wheel 162 becomes stuck in a damaged portion of the floor 118.

In one or more embodiments, the robotic carton unloader 100 can include at least one front vision sensor 172 that can perform at least one of detecting cartons 104 of the carton pile 106, detecting a dropped carton 104', and detecting features of the robotic arm assembly 102 and front portion 142 of the conveyor system 110. The controller 154 can execute a self-calibration module 174 that determines a three-dimension position of the features of the robotic arm assembly 102 and front portion 142 of the conveyor system 110. For example, the front vision sensor 172 can be inherently three-dimensional such as including a distance measuring signal. Alternatively, the front vision sensor 172 can include multiple two-dimensional vision sensors from which a binocular effect can derive three-dimensional information. Alternatively, image processing for known physical dimensions of the features can be used to calculate three dimensional information. The self-calibration module 174 can include instructions to calibrate the robotic arm assembly 102 by: (a) commanding the robotic arm assembly 102 to a defined position; (b) detecting the three-dimensional position of the robotic arm assembly 102 in the image received from the front vision sensor 172, and (c) calculating a calibration adjustment based on an error between the defined position and the detected position.

In one or more embodiments, the controller 154 can execute an obstruction detection module 180 that determines whether an object such as the dropped carton 104' is proximate to the mobile body 114. Similarly, the obstruction detection module 180 can determine that a portion of the carton pile container 108 is proximate to the mobile body 114. The obstruction detection module 180 can determine that the object can be damaged by movement of the selected one of the robotic arm assembly 102, the lift 140, and the mobile body 114. In response to determining that the object is proximate to the mobile body 114 and can be damaged, the object detection module 180 can prevent or constrain the movement of the selected one of the robotic arm assembly 102, lift 140 and the mobile body 114.

The obstruction detection module 180 can thus constrain automatic, manual or telecontrol operations of the robotic carton unloader 100. For example, a warehouse execution system (WES) 182 can have a warehouse management system (WMS) 184 that controls order fulfillment, labor management, and inventory tracking for a facility 186 such as a distribution center. WES 182 can include a warehouse control system (WCS) 188 that controls automation that carries out the order fulfillment and inventory movements requested by the WMS 184. A telecontrol workstation 190 can provide a telecontrol graphical user interface (GUI) 192 that allows a remote operator 194, such as using an instrumented glove 196, to takeover certain control functions of the robotic carton unloader 100. For instance, the controller 154 may be unable to engage a carton 104 from the carton pile 106 or the dropped carton 104'. A telecontroller module 198 executed by the controller 154 can be responsive to the telecontrol GUI 192 via the WCS 188 but be limited by the obstruction detection module 180 to prevent damage to the robotic carton unloader 100 or the carton pile container 108. Similarly, in one or more embodiments, the robotic carton unloader 100 further includes a rear vision sensor 200 that can detect objects such as a local operator 202 that is performing maintenance on or an inspection of the robotic carton unloader 100. A safety lockout module 204 of the controller 154 can be responsive to one or more inputs to prevent automatic or manual movement of the robotic carton unloader 100, such as an open access door or an interrupted light curtain at a rear side of the robotic carton unloader 100, or an inserted lockout pin (not shown). If such safety lock outs should be defeated or fail for some reason, the obstruction detection module 180 with imagery provided by either or both of the front and rear vision sensors 172, 200 can prevent movement of the robotic carton unloader 100 altogether or at least prevent movement that can cause damage or injury.

In one or more embodiments, the manipulator head 136 includes at least one vacuum manipulator 206. The robotic carton unloader 100 has a pneumatic system 208 to selectively perform a sequence of operations of (i) engaging the at least one carton 104 with suction from a vacuum source 209; (ii) disengaging the at least one carton 104 by removing the suction; and (iii) clearing debris from the at least one vacuum manipulator 206 by directing compressed air from a compressed air source 210 through the at least one vacuum manipulator 206. Such clearing can be open-loop controlled, routinely occurring a portion of the cycle in which no carton 104 is expected to block the at least one vacuum manipulator 206. For example, the pneumatic system 208 can couple a compressed air source 210 to speed disengagement of the vacuum manipulator 206 from the carton/s 104 and to simultaneously clean debris from the vacuum manipulator 206.

In one or more embodiments, a suction monitoring module 212 of the controller 154 can perform closed-loop control of debris clearing or at least debris reporting. For example, a debris filter 214 can capture or block debris from reaching sensitive pneumatic valves with the pneumatic system 208. Detecting the debris filter 214 being covered or filled with debris can be used to trigger a manual cleaning or filter replacement task. In an exemplary embodiment, a pressure sensor 216 in pneumatic communication with the pneumatic system 208 to detect a pressure indication associated with the at least one vacuum manipulator 206. The controller 154 is in communication with a vision system such as the front vision sensor 172, the pneumatic system 208 and the pressure sensor 216. The controller 154 executes instructions of a suction monitoring module 218 to selectively clear debris from the at least one vacuum manipulator by: (a) receiving an image of the carton pile 106; (b) detecting the at least one carton 104 in the carton pile 106 from the image; (c) positioning the manipulator head 136 to engage the at least one carton 104 with the at least one vacuum manipulator 206; (d) causing the pneumatic system 208 to couple the vacuum source 209 to the at least one vacuum manipulator 206; (e) moving the robotic arm assembly 102 and the lift 140 to position the at least one carton 104 on the conveyor system 110; (f) disengaging the at least one carton 104 by causing the pneumatic system 208 to decouple the vacuum source 209 from the at least one vacuum manipulator 206; (g) moving the robotic arm assembly 102 away from the at least one carton 104 to enable conveying of the at least one carton 104 by the conveyor system 110; (h) determining that the at least one vacuum manipulator 206 is clogged with debris; and (i) clearing debris from the at least one vacuum manipulator 206 by directing the pneumatic system 208 to couple the compressed air source 210 through the at least one vacuum manipulator 206.

Independent but coordinated movement of a telescoping end 211 of the extendable conveyor 112 and the robotic carton unloader 100 can be achieved by a 3-axis string encoder (not shown). Alternatively, the robotic carton unloader 100 can include an augmented reality (AR) target 213 that is imaged by a camera 215 on the extendable conveyor 112. A vision=based lead-follower system 217 coordinates movement of the extendable conveyor 112 and the robotic carton unloader 100 to maintain alignment and spacing for proper conveying of articles 104.

Figure 2:
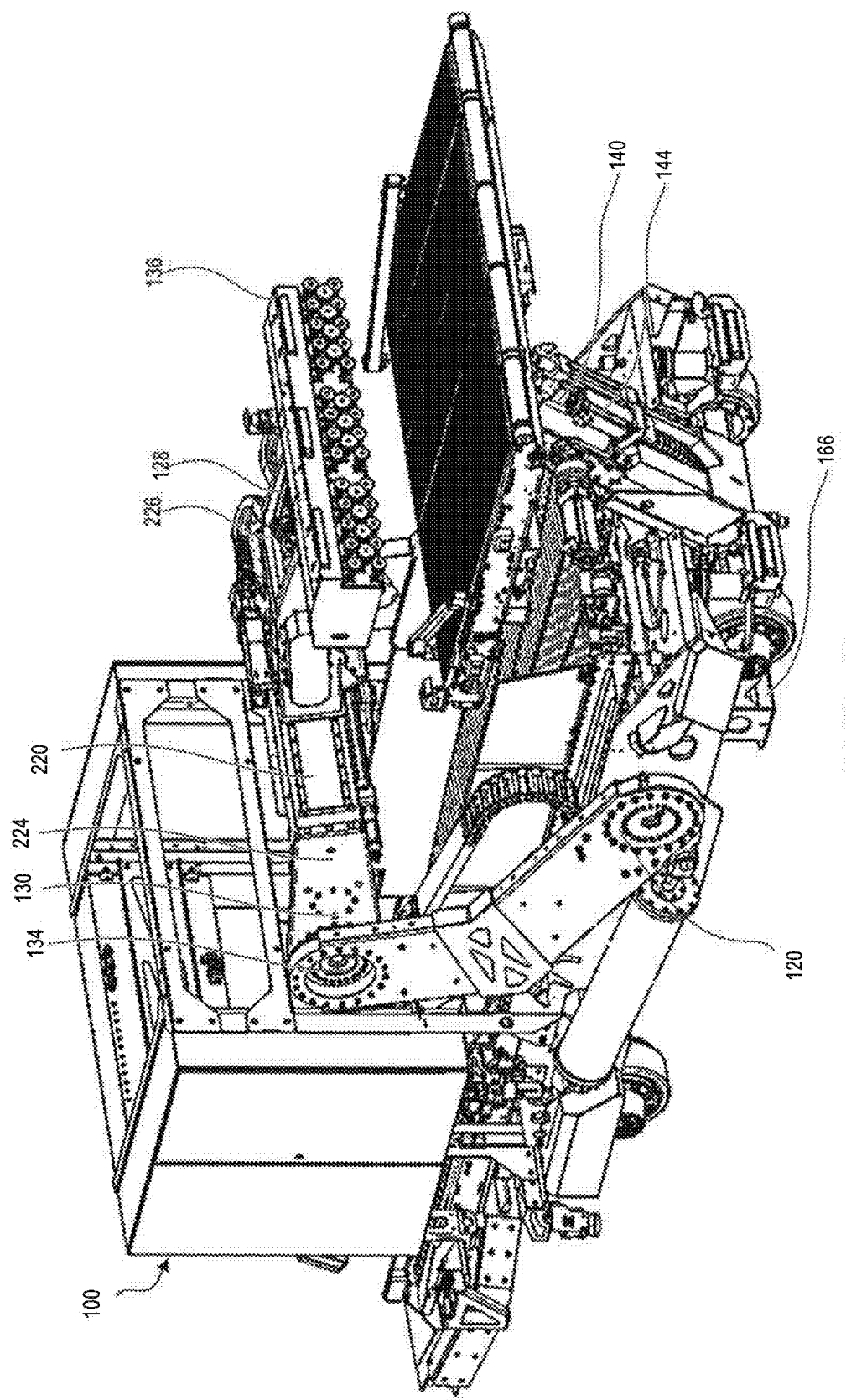
FIG. 2 illustrates a top isometric view of the robotic carton unloader of FIG. 1, according to one or more embodiments.
Figure 3:
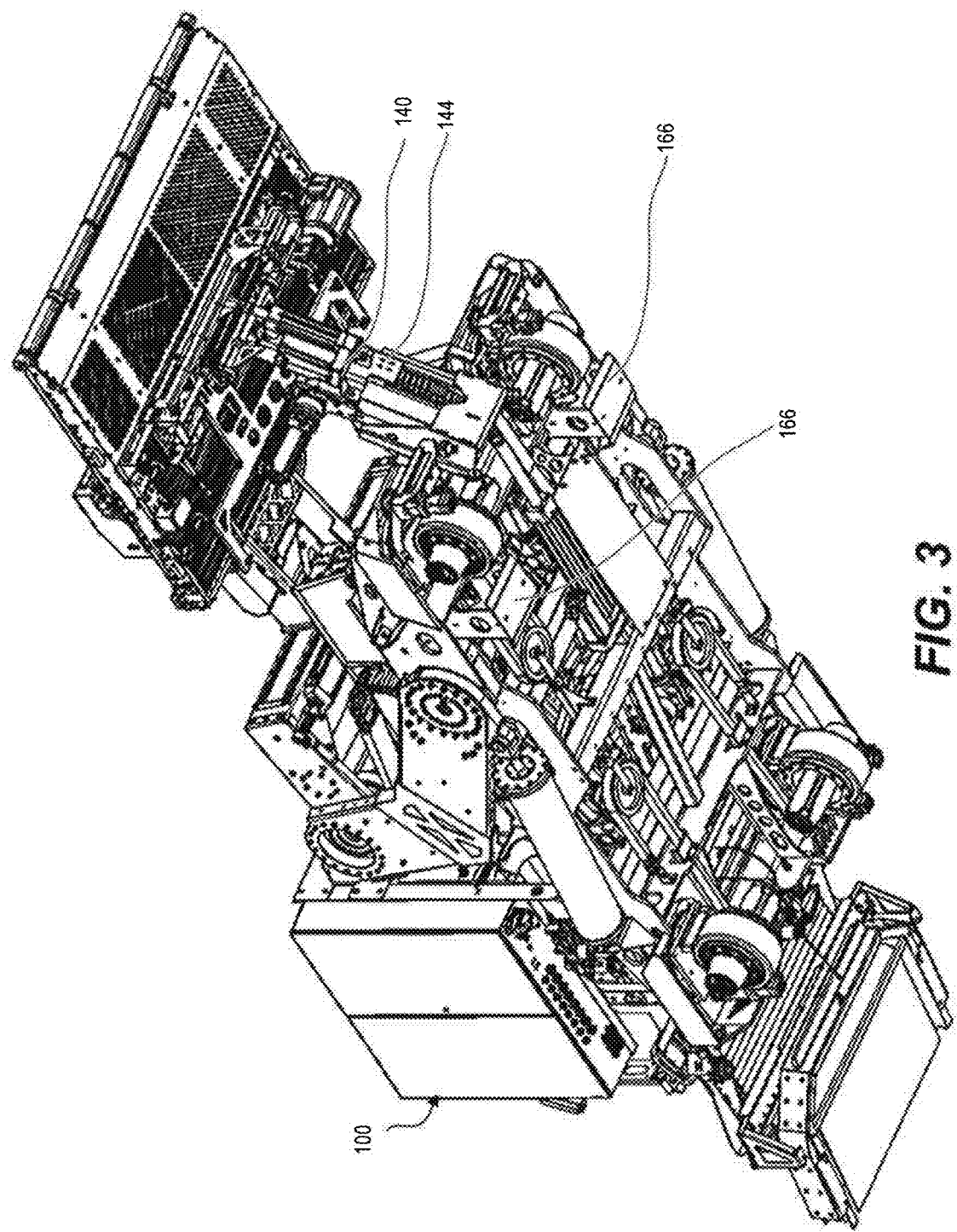
FIG. 3 illustrates a bottom isometric view of the robotic carton unloader of FIG. 1, according to one or more embodiments.

FIG. 2 illustrates that the upper arm assembly 128 includes a rotatable gantry 220 having the rear end 130 pivotally attached at the upper arm axis 134 to the left and right lower arms 120. The rotatable gantry 220 has a lateral guide 222 at an extended end 224. The upper arm assembly 128 includes an end arm 226 proximally attached for lateral movement to the lateral guide 222 of the rotatable gantry 220 and distally attached to the manipulator head 136. The end arm 226 laterally translates to reach an increased lateral area. Thereby a lighter weight and more maneuverable manipulator head 136 can be employed. FIGS. 2-3 illustrate the telescoping beam 144 of the lift 140 and the built-in jacking apparatus 166. A nose tilting hydraulic actuator 225 is mounted between the telescoping beam 144 and a forward end of the front portion 142 of the conveyor system 110. A drive belt motor 227 is mounted to the telescoping beam 144 to extend and to retract the telescoping beam 144.

Figure 4:
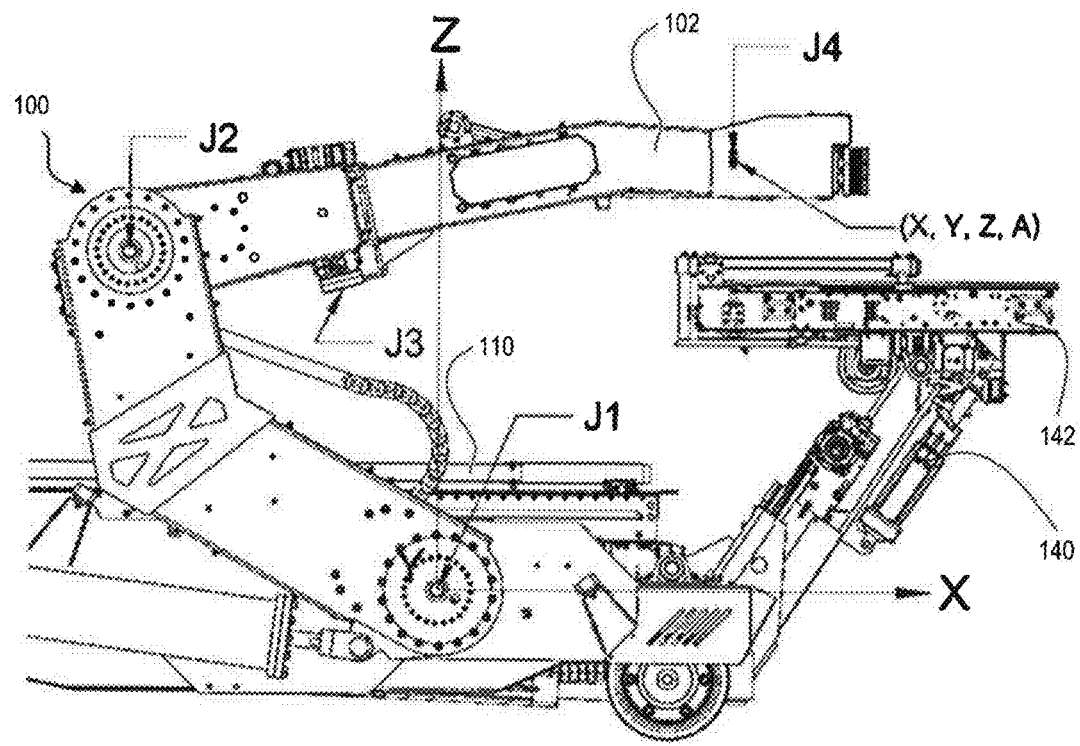
FIG. 4 illustrates a side view of a forward portion of the robotic carton unloader of FIG. 1, according to one or more embodiments.
Figure 5:
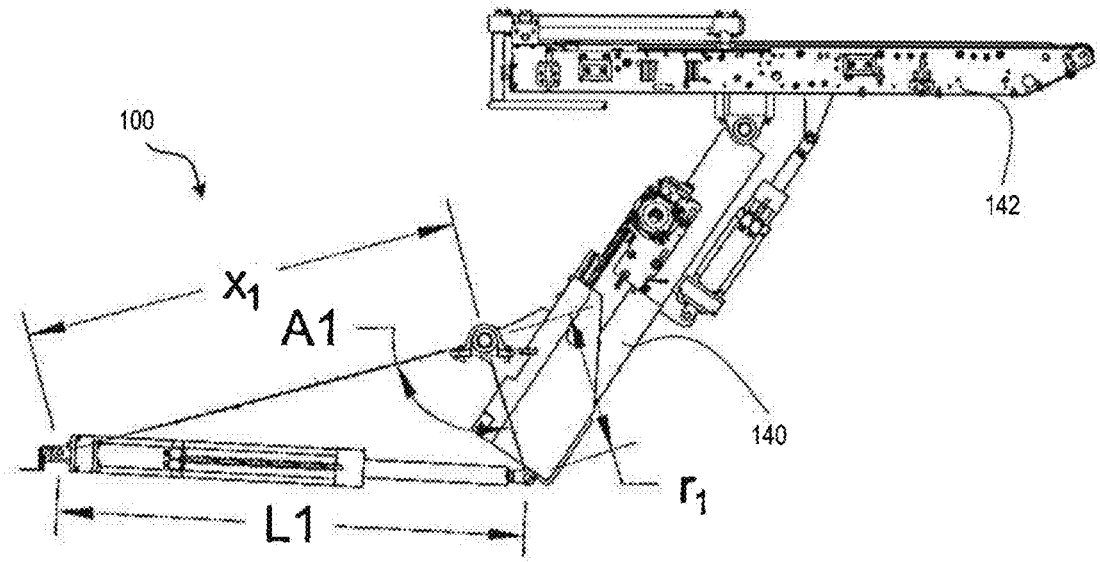
FIG. 5 illustrates a side view of the front portion of conveyor system and lift of the robotic carton unloader of FIG. 1 annotated with a first set of geometric dimensions, according to one or more embodiments.
Figure 6:
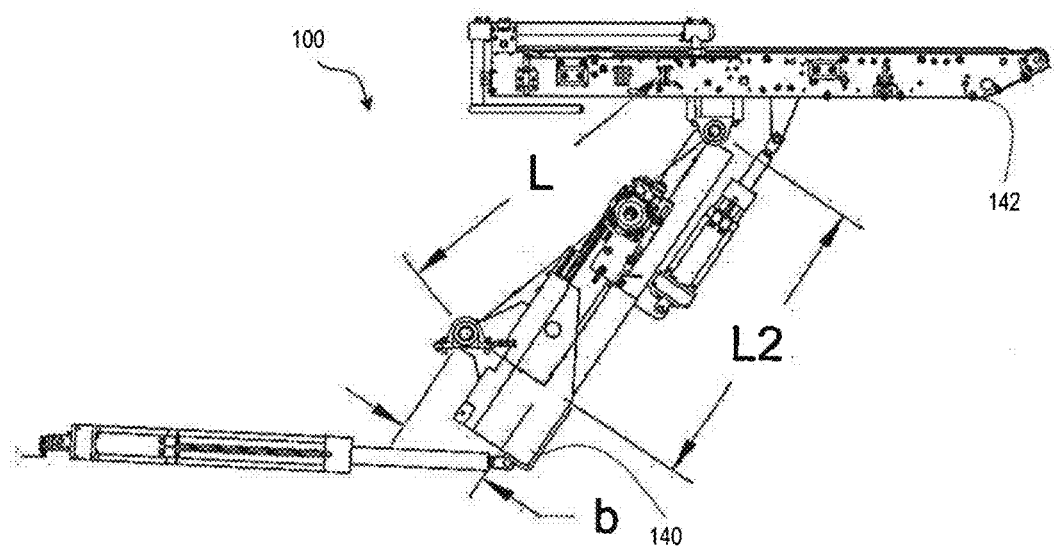
FIG. 6 illustrates the side view of the front portion of conveyor system and lift of the robotic carton unloader of FIG. 1 annotated with a second set of geometric dimensions, according to one or more embodiments.
Figure 7:
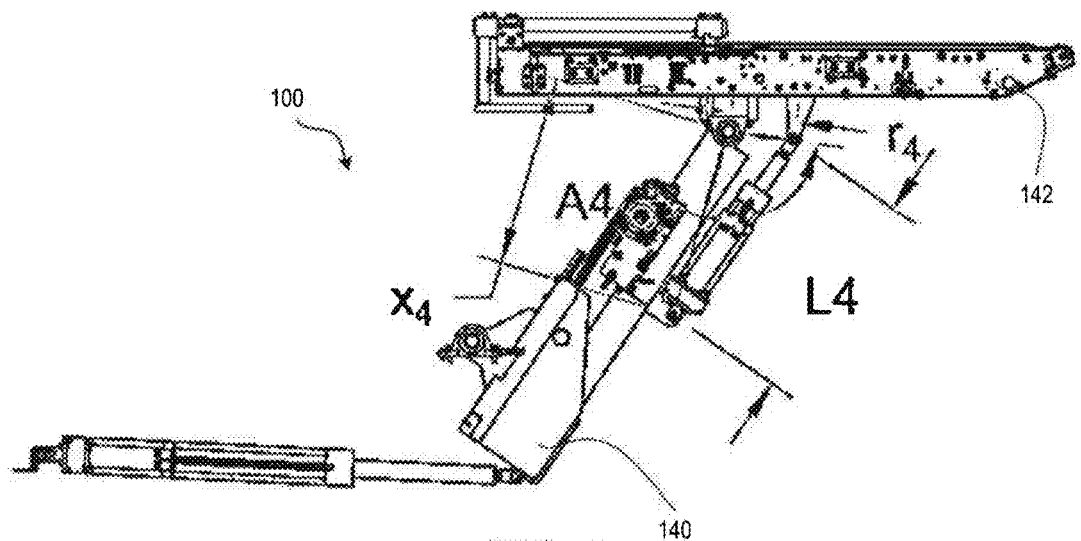
FIG. 7 illustrates the side view of the front portion of conveyor system and lift of the robotic carton unloader of FIG. 1 annotated with a third set of geometric dimensions, according to one or more embodiments.

FIG. 4 illustrates the coordinated positions of robotic arm assembly 102 and front portion 142 of the conveying system 110 positioned by the lift 140 of the robotic carton unloader 100. To facilitate controlling the various actuators, FIG. 4 illustrates manipulator joint positions are the result of transforming the Cartesian coordinates (x, y, z, A), to SCARA coordinates (J, J2, J3, A). The inverse transform is done to calculate the Cartesian coordinates from the SCARA coordinates. The transform calculations are done on the (x, z) and (J1, J3) coordinates using the MCTP function block available in the Logix Designer software. Y=J3, and A is defined as the angle of the tool with respect to the X axis and is the same in both coordinate systems. The coordinated motion of joints J1, J2 is accomplished using the MCT function block to link the joint axis to the virtual Cartesian axis X and Z. The motion is then commanded using the virtual axis X, Y, Z and the MCLM function block. J3=Y and is the same in both coordinate systems.

Manipulator:
$A_{j1}$=Actual angle of Axis J1 (Deg).
$A_{j2}$=Actual angle of Axis J2 (Deg).
$J_3$=Actual position of Axis J3 (mm).
$A_{j4}$=Actual angle of the tool Axis 14 (Deg).
A=Angle of the tool in world frame (Deg).
X=Manipulator cartesian coordinate virtual axis x (mm).
Y=Manipulator cartesian coordinate virtual axis y (mm).
Z=Manipulator cartesian coordinate virtual axis z (mm).

$$A_{j4}=A_{j2}-A_{j1}+A$$

FIGS. 5-8 illustrate that the conveyor Cartesian coordinates and joint positions are calculated as follows for the lift 140 and front portion 142 of the robotic carton unloader 100 (FIG. 1). A is defined as the angle of the conveyor with respect to the X axis and is the same in both coordinate systems.

The coordinated motion of the conveyor joint axis is accomplished in three steps. First, the coordinated motion is commanded using the MCLM function block and the virtual Cartesian axis. The virtual axis A1, L, and A4 are then commanded using the equations listed below. The result of the equation for A1 is used as the commanded position in a MAM function block controlling the virtual axis A1. The function block is triggered periodically. This causes the position of A1 to "chase" the result of the equation for A1. The same technique is used for L and A4. Lastly, the joint axis L1, L2, and L4 are each controlled with a cam profile function block MACP. A1 is the master for L1 and L is the master for L2, and A4 is the master for L4. The cam profiles are derived from the equations below. L3=Y and is the same in both coordinate systems.

Conveyor:
$L_1$=total length of Axis L1 Linear actuator (mm).
$L_2$=total length of Axis L2 Linear actuator (mm).
$L_3$=Actual position of Axis L3 (mm).
$L_4$=total length of Axis L4 Linear actuator (mm).
$r_1$=length of the connection between L1 and A1 (mm).
$x_1$=distance from L1 rear mount to A1 (mm).
$r_4$=length of the connection between L4 and A4 (mm).
$x_4$=distance from L4 rear mount to A4 (mm).
b=distance from A1 perpendicular to L2 line of motion (mm).
A=Angle of the conveyor in world frame (Deg).
L=Virtual axis connecting virtual axis A1 and A4 (mm).
$A_1$=Angle of virtual axis A1 (Deg).
$A_4$=Angle of virtual axis A4 (Deg).
x=Conveyor cartesian coordinate virtual axis x (mm).
y=Conveyor cartesian coordinate virtual axis y (mm).
z=Conveyor cartesian coordinate virtual axis z (mm).
Joint to Cartesian Transform:

$$A_1 = \text{Cos}^{-1}\left(\frac{(r_1^2 + x_1^2 - L_1^2)}{2r_1 x_1}\right)$$

$$A_4 = \text{Cos}^{-1}\left(\frac{(r_4^2 + x_4^2 - L_4^2)}{2r_4 x_4}\right)$$

$$x = \sqrt{L_2^2 + b^2} \times \text{Cos}\left(A_1 - \text{Tan}^{-1}\left(\frac{b}{L_2}\right) - 36.1°\right)$$

$$y = L_3$$

-continued $$z = \sqrt{L_2^2 + b^2} \times \mathrm{Sin}\left(A_1 - \mathrm{Tan}^{-1}\left(\frac{b}{L_2}\right) - 36.1°\right)$$

$$A = 180.7° - A_1 - A_4$$

Cartesian to Joint Transform:

$$A_1 = 36.1° + \mathrm{Tan}^{-1}\left(\frac{z}{x}\right) + \mathrm{Sin}^{-1}\left(\frac{b}{\sqrt{x^2 + z^2}}\right)$$

$$L = \sqrt{x^2 + z^2}$$

$$A_4 = 144.6° - \mathrm{Tan}^{-1}\left(\frac{z}{x}\right) - \mathrm{Sin}^{-1}\left(\frac{b}{\sqrt{x^2 + z^2}}\right) - A$$

$$L_1 = \sqrt{r_1^2 + x_1^2 - 2r_1 x_1 \mathrm{Cos}(A_1)}$$

$$L_2 = \sqrt{L^2 - b^2}$$

$$L_3 = y$$

$$L_4 = \sqrt{r_4^2 + x_4^2 - 2r_4 x_4 \mathrm{Cos}(A_4)}$$

Commanded Angle for Tool/Conveyor:
$x_c$=Current x coordinate (mm).
$y_c$=Current y coordinate (mm).
$z_c$=Current z coordinate (mm).
$x_s$=Starting x coordinate (mm).
$y_s$=Starting y coordinate (mm).
$z_s$=Starting z coordinate (mm).
$A_s$=Starting Angle (Deg).
$x_e$=Ending x coordinate (mm).
$y_e$=Ending y coordinate (mm).
$z_e$=Ending z coordinate (mm).
$A_e$=Ending Angle (Deg).
$A_t$=Total motion Angle (Deg).
$D_t$=total point to point move distance (mm).
$D_r$=current remaining point to point move distance (mm).
$A_c$=Commanded angle of the tool/conveyor (Deg).
$C$=Command tollerance (mm).

$$D_t = \sqrt{(x_e - x_s)^2 + (y_e - y_s)^2 + (z_e - z_s)^2}$$

$$D_r = \sqrt{(x_e - x_c)^2 + (y_e - y_c)^2 + (z_e - z_c)^2}$$

$$A_t = A_e - A_s$$

Commanded Angle Fine Point Move:

$$A_c = A_s + A_t\left(1 - \frac{D_r}{D_t}\right)$$

Commanded Angle Single End Blended Move:

$$D_r > C : A_c = A_s + A_t\left(1 - \frac{D_r - 2C}{D_t - 2C}\right)$$

$$D_r \leq C : A_c = A_e$$

Commanded Angle Double End Blended Move:

$$D_r > 2C : A_c = A_s + A_t\left(1 - \frac{D_r - 2C}{D_t - 2C}\right)$$

$$D_r \leq 2C : A_c = A_e$$

Linear Motion Limits Based on Joint Motion Limits:

$(x_s, y_s, z_s, A_s)$ = Cartesian start position of the tool/conveyor (mm).

$(x_e, y_e, z_e, A_e)$ = Cartesian end position of the tool/conveyor (mm).

$(J1_s, J2_s, J3_s, A_s)$ =

Joint start position of the tool/conveyor (Deg) or (mm)

$(J1_e, J2_e, J3_e, A_e)$ = Joint end position of the tool/conveyor (Deg) or (mm)

$J_s$ = Start position of the Joint Axis(Deg) or (mm).

$J_e$ = End position of the Joint Axis(Deg) or (mm).

$d_j$ = Move distance of the Joint Axis(Deg) or (mm).

$d_l$ = Linear move distance of the tool/conveyor (mm).

$\alpha_{sp}$ = Linear Acceleration Set Point of the Tool/Conveyor $\left(\frac{mm}{S^2}\right)$.

$v_{sp}$ = Linear Velocity Set Point of the Tool/Conveyor $\left(\frac{mm}{S}\right)$.

$t_{sp}$ = Minimum Linear Move Time at $\alpha_{sp}$ (S).

$\alpha_l$ = Linear Acceleration of the Tool/Conveyor $\left(\frac{mm}{S^2}\right)$.

$t_l$ = Minimum Linear Move Time at $\alpha_l$ (S).

$v_{max}$ = Maximum Linear

Velocity of the Tool/Conveyor at $a_l\left(\frac{mm}{S}\right)$.

$v_l$ = Linear Velocity of the Tool/Conveyor $\left(\frac{mm}{S}\right)$.

$v_{lim}$ = Velocity Limit of a given axis $\left(\frac{mm}{S}\right)$ or $\left(\frac{Deg}{S}\right)$ $\alpha_{lim}$ = Acceleration Limit of a given axis $\left(\frac{mm}{S^2}\right)$ or $\left(\frac{Deg}{S^2}\right)$ $\alpha_j$ = Acceleration Joint Axis $\left(\frac{Deg}{S^2}\right)$ or $\left(\frac{mm}{S^2}\right)$.

$v_j$ = Velocity of the Joint Axis $\left(\frac{Deg}{S^2}\right)$ or $\left(\frac{mm}{S^2}\right)$.

Figure 8A:
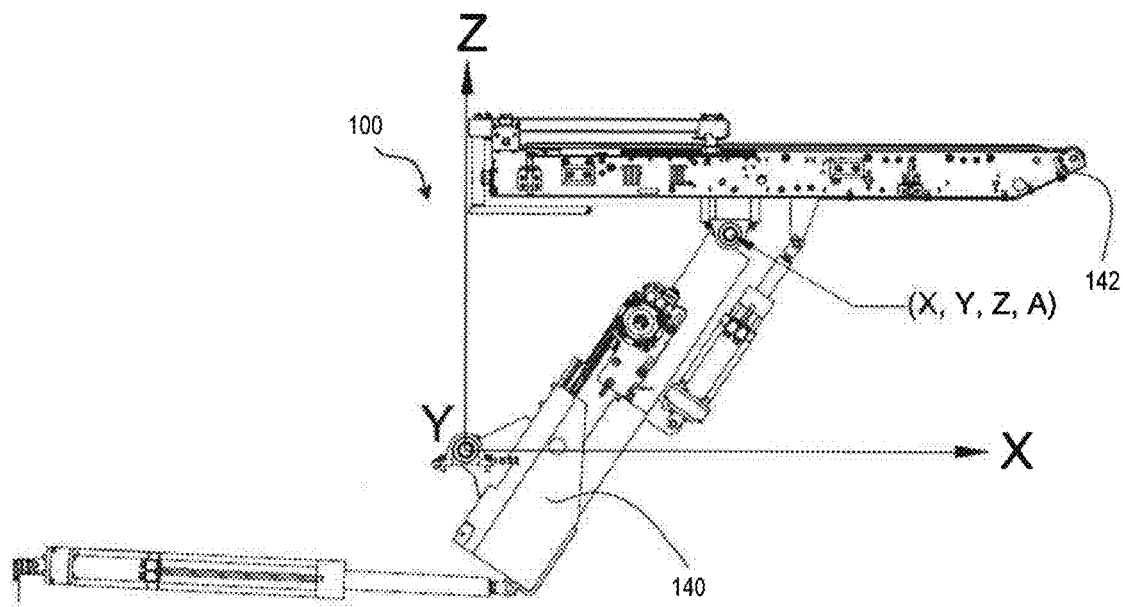
FIG. 8A illustrates the side view of the front portion of conveyor system and lift of the robotic carton unloader of FIG. 1 annotated with a fourth set of geometric dimensions, according to one or more embodiments.

The manipulator joint start and end positions are the result of transforming the calculated start and end positions from Cartesian coordinates (x, y, z, A), to SCARA coordinates (J1, J2, J3, A). The transform calculation is done on the (x, z) and (J1, J2) coordinates using the MCTP function block available in the Logix Designer software. Y=J3, and A is a coordinate common to both systems defined as the angle of the tool/conveyor with respect to the X axis as illustrated in FIGS. 4 and 8A.

The conveyor joint start and end positions are as follows:

A1: $J_s = \mathrm{Tan}^{-1}\left(\frac{z_s}{x_s}\right)$; $J_e = \mathrm{Tan}^{-1}\left(\frac{z_e}{x_e}\right)$ L: $J_s = \sqrt{x_s^2 + z_s^2}$; $J_e = \sqrt{x_e^2 + z_e^2}$ Y: $J_s = y_s$; $J_e = y_e$ A4: $J_s = 180.7° - J_{1s} - A_s$; $J_e = 180.7° - J_{1e} - A_e$ $d_l = \sqrt{(x_e - x_s)^2 + (y_e - y_s)^2 + (z_e - z_s)^2}$ -continued $$d_j = J_e - J_s$$

Calculate the actual linear acceleration based on joint acceleration limits:

$$t_{sp} = \sqrt{\frac{d_l}{a_{sp}}}$$

$$a_j = \frac{d_j}{t_{sp}^2}$$

IF: $a_j > a_{lim}$; $a_l = \frac{a_{sp} a_{lim}}{a_j}$

IF: $a_j \leq a_{lim}$; $a_l = a_{sp}$

Calculate the actual linear velocity based on joint velocity limits:

$$t_l = \sqrt{\frac{d_l}{a_l}}$$

$$v_{max} = a_l t_l$$

$$d_l = \frac{1}{2} v_{max} t_l$$

$$d_j = \frac{1}{2} v_j t_l$$

$$2\frac{d_l}{v_l} = 2\frac{d_j}{v_j}$$

$$v_j = \frac{v_{max} d_j}{d_l}$$

IF: $v_j > v_{lim}$; $v_l = \frac{v_{max} v_{lim}}{v_j}$

IF: $v_j \leq v_{lim}$; $v_l = v_{sp}$

The collision avoidance is accomplished by monitoring a virtual line segment situated above the conveyor surface. If the manipulator tool violates this line segment from above, all motion is stopped. The constants in the following equations are derived from the physical dimensions of the manipulator head and conveyor system.

Collision Avoidance:
$A_{ct}$=Current tool angle (Deg).
$x_{ct}$=Current tool x position in cartesian coordinates (mm).
$z_{ct}$=Current tool z position in cartesian coordinates (mm).
$x_{tf}$=Current front of tool x position in cartesian coordinates (mm).
$z_{tf}$=Current front of tool z position in cartesian coordinates (mm).
$x_{tr}$=Current rear of tool x position in cartesian coordinates (mm).
$z_{tr}$=Current rear of tool z position in cartesian coordinates (mm).
$A_{cc}$=Current conveyor angle (Deg).
$x_{cc}$=Current conveyor x position in cartesian coordinates (mm).
$z_{cc}$=Current conveyor z position in cartesian coordinates (mm).
$x_{cf}$=Current front of conveyor x position in cartesian coordinates (mm).
$z_{cf}$=Current front of conveyor z position in cartesian coordinates (mm).
$x_{cr}$=Current rear of conveyor x position in cartesian coordinates (mm).
$z_{cr}$=Current rear of conveyor z position in cartesian coordinates (mm).
$z_{fl}$=Current z lower limit in cartesian coordinates for the front of the tool (mm).
$z_{rl}$=Current z lower limit in cartesian coordinates for the front of the tool (mm).

$$x_{tf} = x_{tc} + 318 \cos(A_{ct} + 19.5°)$$

$$z_{tf} = z_{tc} + 318 \sin(A_{ct} + 19.5°)$$

$$x_{tr} = x_{tc} - 613 \cos(-A_{ct} + 14.2°)$$

$$z_{tr} = z_{tc} - 613 \sin(-A_{ct} + 14.2°)$$

$$x_{cf} = x_{cc} + 1077 \cos(-A_{cc} + 21.8°)$$

$$z_{cf} = z_{cc} + 1077 \sin(-A_{cc} + 21.8°)$$

$$x_{cr} = x_{cc} - 894 \cos(A_{cc} + 26.5°)$$

$$z_{cr} = z_{cc} + 894 \sin(A_{cc} + 26.5°)$$

If $x_{ct} < 500$: $z_{fl} = z_{fr} = 480$ (The manipulator tool is above the fixed height unscrambler conveyor.)
If $x_{ct} \geq 500$:

$$z_{fl} = \frac{z_{cf} - z_{cr}}{x_{cf} - x_{cr}} (x_{tf} - 780) + \frac{z_{cf} - z_{cr}}{x_{cf} - x_{cr}} (z_{cr} - x_{cr})$$

$$z_{rl} = \frac{z_{cf} - z_{cr}}{x_{cf} - x_{cr}} (x_{tr} - 780) + \frac{z_{cf} - z_{cr}}{x_{cf} - x_{cr}} (z_{cr} - x_{cr})$$

All motion is stopped if:

$z_{tf} - z_{fl} < 50$; or $z_{tr} - z_{fr} < 50$

The vehicle will move down the length of the trailer keeping centered and perpendicular to the trailer. The vehicle has four independently controlled wheels. Each wheel has a steering servo motor and a traction servo motor. The vehicle will move in such a way as to correct for any vehicle yaw (skew) within the trailer or error in side to side clearance during each motion command.

Figure 8B:
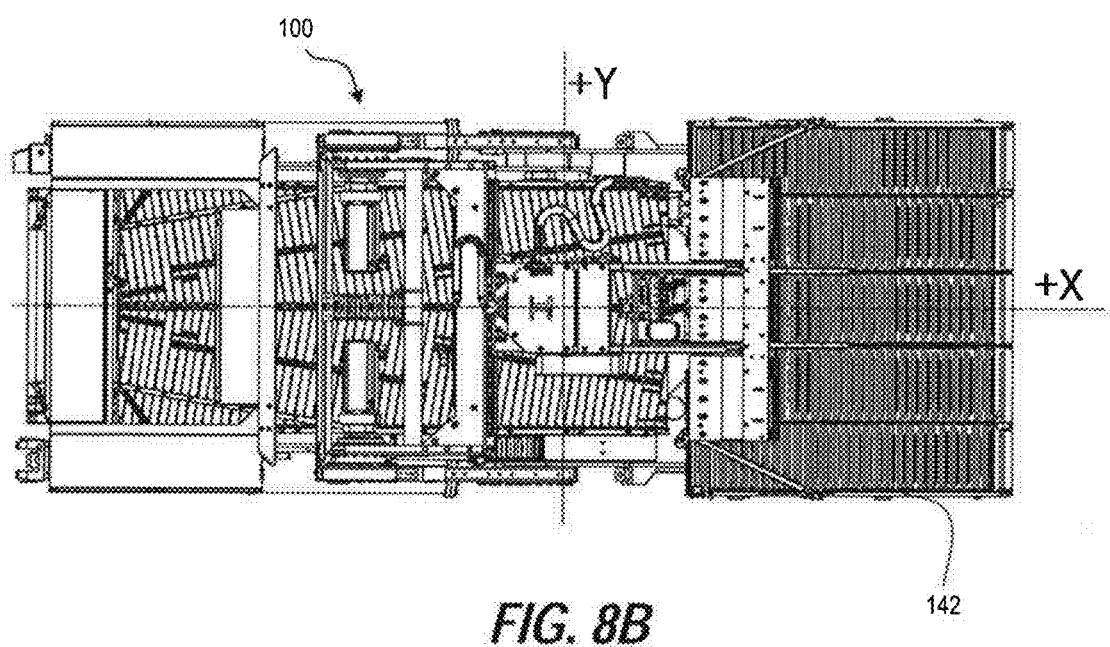
FIG. 8B illustrates a top view of a forward portion of the robotic carton unloader of FIG. 1 annotated with a fifth set of geometric dimensions, according to one or more embodiments.

FIG. 8B illustrates that the center of rotation is an arbitrary point in vehicle frame about which the vehicle (robotic carton unloader 100) will rotate during a yaw correction. This point is variable and can be moved so that the yaw correction can be done while avoiding collisions with obstacles in the vicinity of the vehicle.

R_cp=Distance from the center point of the vehicle rotation to the center point of the wheel rotation (mm).
θ_cp=Angle between the line from the center point of vehicle rotation parallel to the vehicle frame X axis and the line from the vehicle center point of rotation to the center point of the wheel rotation (Deg).
D_t=Total travel distance of the commanded vehicle motion (mm).
α=Yaw correction of the commanded vehicle motion (Deg).
V=Speed of the commanded vehicle motion (mm/S)
A=Angle of the commanded vehicle motion (Deg).
θ_n=Commanded wheel steering angle in vehicle frame at travel distance (D_t n)/1000 (Deg).
X_n=The x coordinate of the wheel position in world frame at distance (D_t n)/1000 (mm).
Y_n=The y coordinate of the wheel position in world frame at distance (D_t n)/1000 (mm).

D_n=The total travel distance of the wheel at distance (D_t n)/1000 (mm).

D=The distance traveled from D_(n−1) to D_n (mm).

The cam profiles for vehicle motion are set to 1001 elements (0-1000). In the equations below, n is the element number in the cam profile. For n=0 to 1000, the angle of the steering motor during the motion of the vehicle from distance 0 to D_t for any given wheel is as follows:

$V\_x = V \sin(A) + ((\alpha VR\_cp)/D\_t)\sin(\pi/2 + \theta\_cp + \alpha n/1000)$ $V\_y = V \cos(A) + ((\alpha VR\_cp)/D\_t)\cos(\pi/2 + \theta\_cp + \alpha n/1000)$ $\theta\_n = [\tan]\hat{}(-1)(V\_x/V\_y) - \alpha n/1000$ The distance traveled by any given wheel during the motion of the vehicle from 0 to D_t is as follows:

$X\_n = R\_cp \cos(\theta\_cp + \alpha n/1000) + ((nD\_t)/1000)\cos(A)$ $Y\_n = R\_cp \sin(\theta\_cp + \alpha n/1000) + ((nD\_t)/1000)\sin(A)$ If $n=0$:

$D\_n = 0$

If $n>0$:

$D \cong \sqrt{(2 \& (X\_n - X\_(n-1))\hat{}2 + (Y\_n - Y\_(n-1))\hat{}2)}$ $D\_n \cong D + D\_(n-1)$ D is a linear approximation of the arc traveled by the wheel from D_(n−1) to D_n. As the number of steps is increased, the approximation is more accurate. For the purposes of controlling the motion of the vehicle, 1000 steps are sufficiently accurate.

Figure 9A:
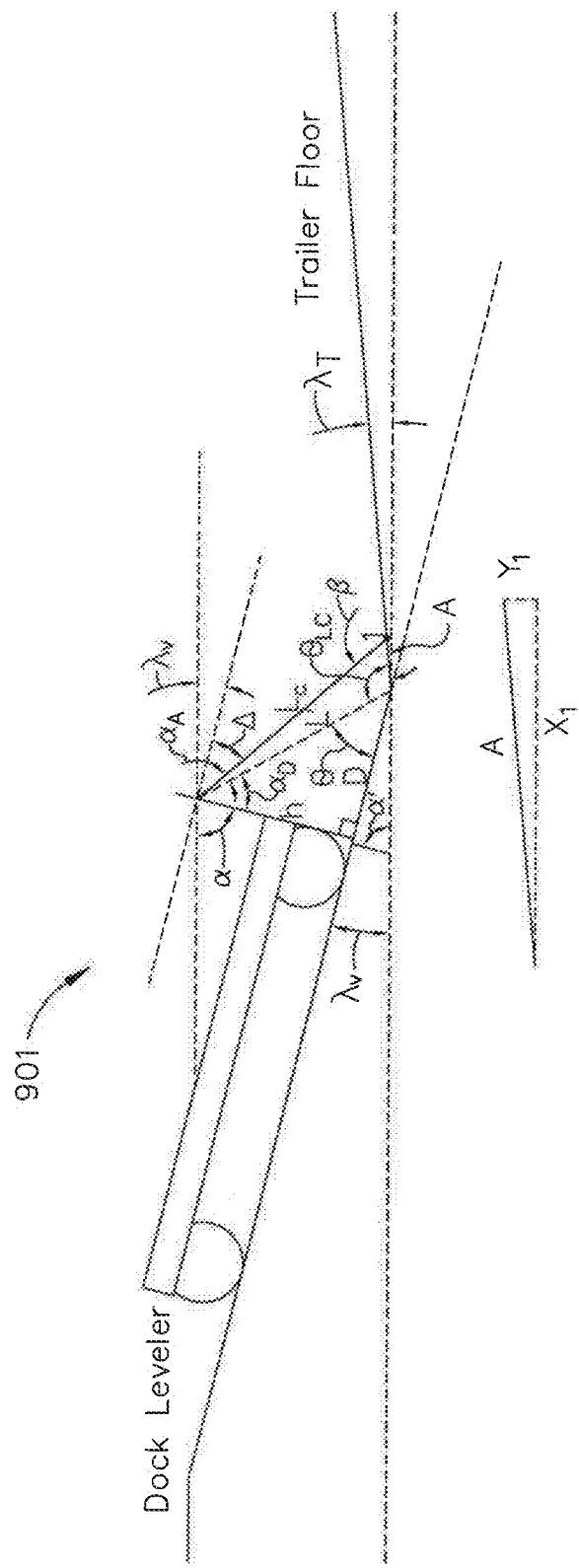
FIG. 9A illustrates a geometric graph of a robotic carton unloader on a declining dock leveler approaching an inclining trailer floor.
Figure 9B:
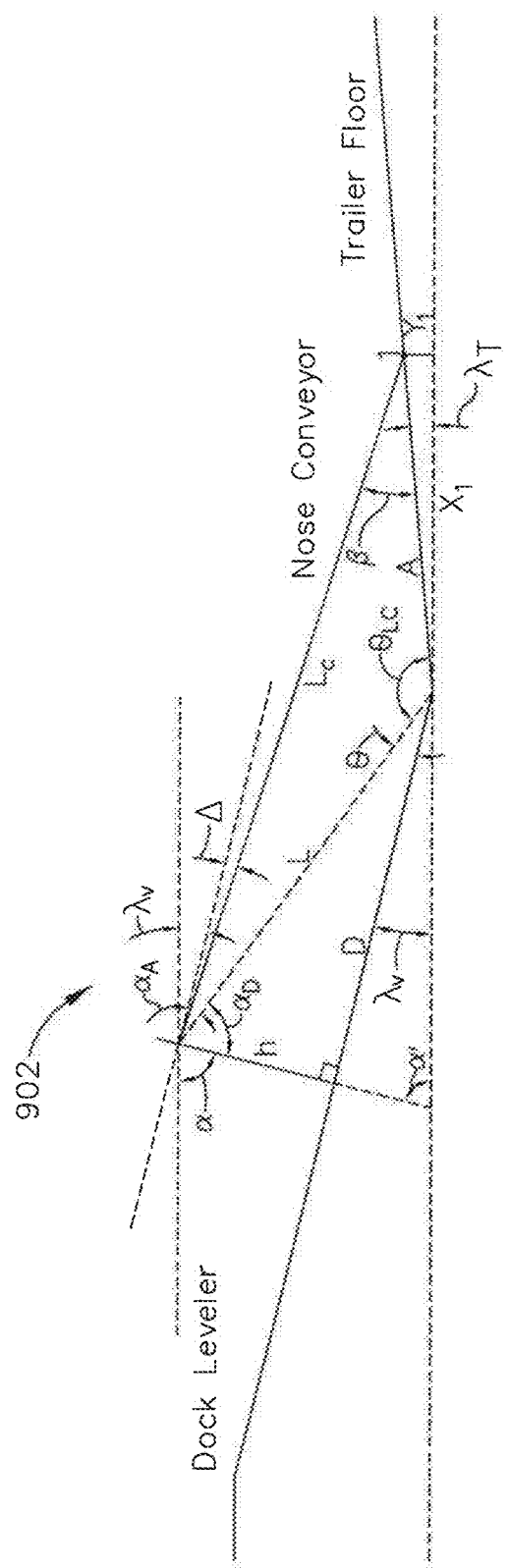
FIG. 9B illustrates a detail view of the geometric graph of FIG. 9B.

FIGS. 9A-9H illustrate graphs 901-908 respectively for refining the relative angle of the "nose conveyor" of the lift 140 and front portion 142 of the robotic carton unloader 100 (FIG. 1) when presented with relative differences in pitch encountered in an underlying dock leveler and trailer/shipping container floor. With reference to FIG. 9A, the angle Δ represents the angle relative to the vehicle that the nose conveyor will tilt down in order to touch the floor. Point 1 represents the point where the end of the nose conveyor touches the floor. The objective is to derive a formula for determining the angle Δ. Known values in graph 901 include:

h=Height of conveyor pivot point;
Lc=Length of nose conveyor;
λV=Angle of vehicle: As measured by Inclinometer mounted on the vehicle. This value will be in reference to level;
λT=Angle of trailer floor, and
D=Distance remaining on leveler from the conveyor pivot point to the end of the leveler. When the unloader is moving off of the leveler, into the trailer; the conveyor pivot point will be ahead of the end of the leveler, resulting in a negative value for D.

Derivation for Value D Greater than or equal to zero:
Coordinate values $X_1$ and $Y_1$ $X_1 = A \cos \lambda_T$ (1)

$Y_1 = A \sin \lambda_T$ (2)

Find hypotenuse L' formed by right triangle from known values h and D.

$L' = \sqrt[2]{h^2 + D^2}$ (3)

Find angle θ

$\theta = \tan^{-1}\left(\frac{h}{D}\right)$ (4)

Find angle $\alpha_D$ $\alpha_D = 90 - \theta$ (5)

Substituting (4) into (5)

$\alpha_D = 90 - \tan^{-1}\left(\frac{h}{D}\right)$ (6)

Find angle α'

$\alpha' = 180 - 90 - \lambda_V$ (7)

$\alpha' = 90 - \lambda_V$ (8)

Find angle $\theta_{LC}$ $\theta_{LC} = 180 - \lambda_T - \lambda_V - \theta$ (9)

$\theta_{LC} = 180 - \lambda_T - \lambda_V - \tan^{-1}\left(\frac{h}{D}\right)$ (10)

Figure 9C:
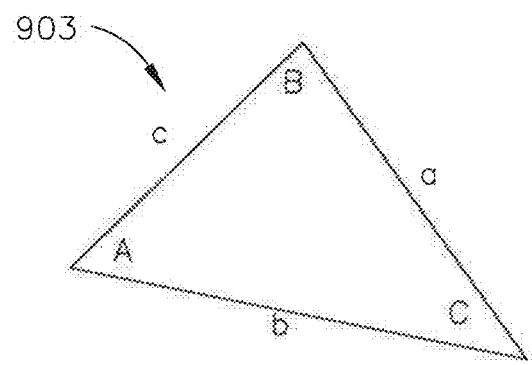
FIG. 9C illustrates a geometric graph representing the law of sines.

Use the law of Sines to find A as depicted in graph 903 in FIG. 9C. Given triangle, ABC:

$\frac{a}{\sin A} = \frac{b}{\sin B} = \frac{c}{\sin C}$ (11)

Figure 9D:
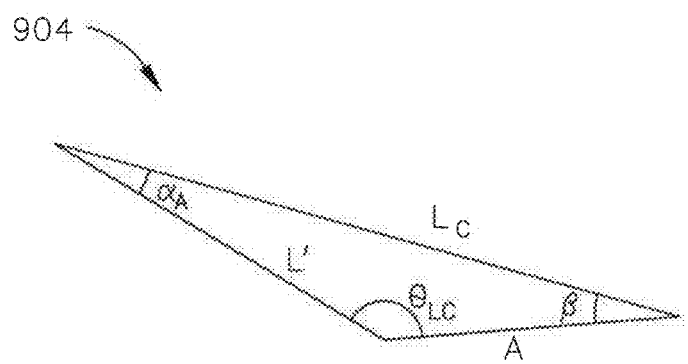
FIG. 9D illustrates a geometric graph of applying the law of sines to the geometric graph of FIG. 9B.

FIG. 9D illustrates a graph 904 for solving for A using triangle L'LcA from the model and the law of Sines.

$\frac{L_C}{\sin \theta_{LC}} = \frac{L'}{\sin \beta} = \frac{A}{\sin \alpha_A}$ (12)

Substitute equation (3) into equation (12):

$\frac{L_C}{\sin \theta_{LC}} = \frac{\sqrt[2]{h^2 + D^2}}{\sin \beta}$ (13)

Solve for angle β:

$\sin \beta = \frac{\sin \theta_{LC} \sqrt[2]{h^2 + D^2}}{L_C}$ (14)

$\beta = \sin^{-1}\left(\frac{\sin \theta_{LC} \sqrt[3]{h^2 + D^2}}{L_C}\right)$ (15)

Solve for angle $\alpha_A$:

(16)  $\alpha_A = 180 - \theta_{LC} - \beta$

Substitute equation (16) into equation (12) and solve for A.

$$\frac{L_C}{\sin\theta_{LC}} = \frac{A}{\sin(180 - \theta_{LC} - \beta)} \quad (17)$$

$$A = \frac{L_C \sin(180 - \theta_{LC} - \beta)}{\sin\theta_{LC}} \quad (18)$$

where $\theta_{LC} = 180 - \lambda_T - \lambda_V - \theta$
and $$\beta = \sin^{-1}\left(\frac{\sin\theta_{LC} \sqrt[2]{h^2 + D^2}}{L_C}\right) \quad (19)$$

Solve for angle Δ

$$\Delta = 180 - \alpha' - \alpha_D - \alpha_A \quad (20)$$

Substituting equations (8), (6), and (16) yields $$\Delta = 180 - (90 - \lambda_V) - \left(90 - \tan^{-1}\left(\frac{h}{D}\right)\right) - (180 - \theta_{LC} - \beta) \quad (21)$$

$$\Delta = -180 + \lambda_V + \tan^{-1}\left(\frac{h}{D}\right) + \theta_{LC} + \beta \quad (22)$$

Substitute for $\theta_{LC}$ (10) and reduce the equation:

$$\Delta = -180 + \lambda_V + \tan^{-1}\left(\frac{h}{D}\right) + \left(180 - \lambda_T - \lambda_V - \tan^{-1}\left(\frac{h}{D}\right)\right) + \beta \quad (23)$$

$$\Delta = -180 + \lambda_V + \tan^{-1}\left(\frac{h}{D}\right) + 180 - \lambda_T - \lambda_V - \tan^{-1}\left(\frac{h}{D}\right) + \beta \quad (24)$$

$$\Delta = -\lambda_T + \beta \quad (25)$$

Substitute for β (15) and $\theta_{LC}$ (16)

$$\Delta = -\lambda_T + \sin^{-1}\left(\frac{\sin\left(180 - \lambda_T - \lambda_V - \tan^{-1}\left(\frac{h}{D}\right)\right)\sqrt[2]{h^2 + D^2}}{L_C}\right) \quad (26)$$

Therefore, Point 1 ($X_1$, $Y_1$): From (1), (2), (18), and (19)

$$X_1 = \left[\frac{L_C \sin(180 - \theta_{LC} - \beta)}{\sin\theta_{LC}}\right]\cos\lambda_T \quad (27)$$

$$Y_1 = \left[\frac{L_C \sin(180 - \theta_{LC} - \beta)}{\sin\theta_{LC}}\right]\sin\lambda_T \quad (28)$$

where $\theta_{LC} = 180 - \lambda_T - \lambda_V - \theta$
and $$\beta = \sin^{-1}\left(\frac{\sin\theta_{LC} \sqrt[2]{h^2 + D^2}}{L_C}\right) \quad (29)$$

Angle Δ: From (26)

$$\Delta = -\lambda_T + \sin^{-1}\left(\frac{\sin\left(180 - \lambda_T - \lambda_V - \tan^{-1}\left(\frac{h}{D}\right)\right)\sqrt[2]{h^2 + D^2}}{L_C}\right) \quad (30)$$

Figure 9E:
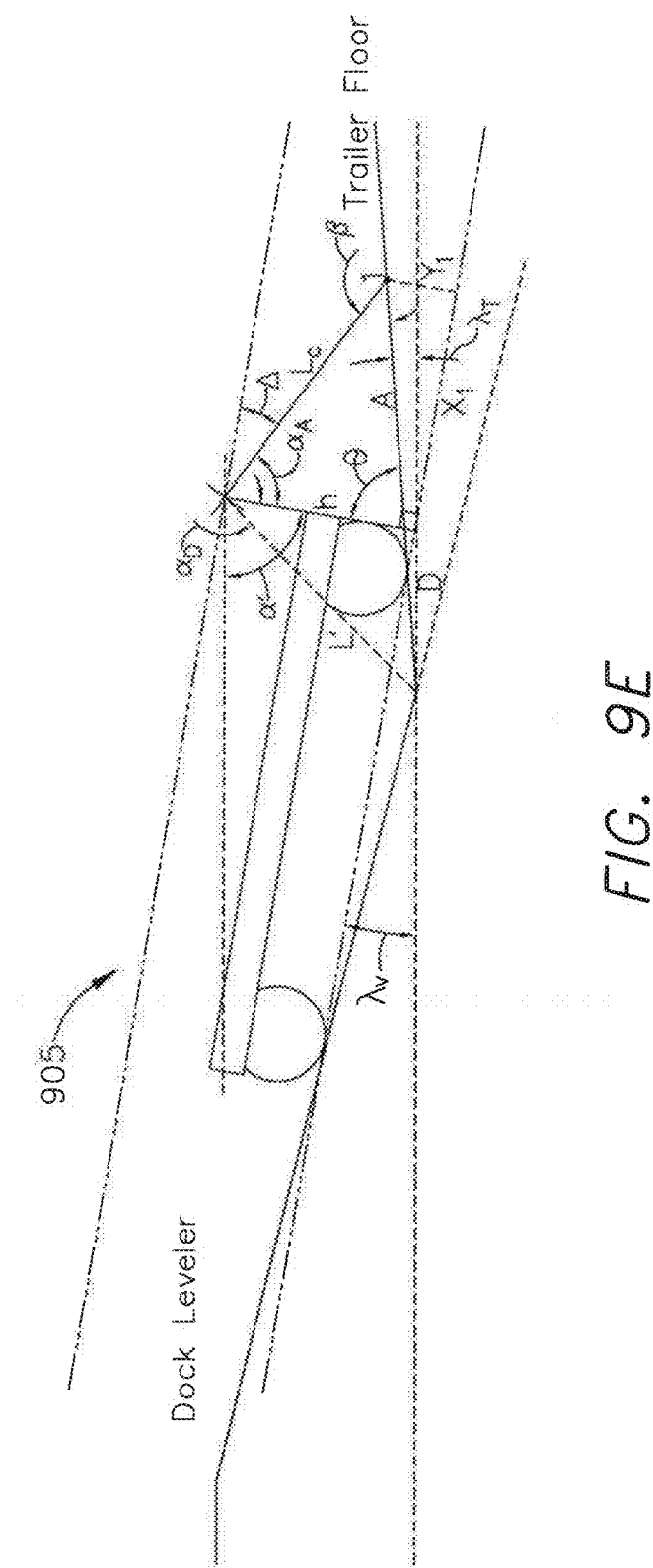
FIG. 9E illustrates a geometric graph of the robotic carton unloader straddling the declining dock leveler and the inclining trailer floor.
Figure 9F:
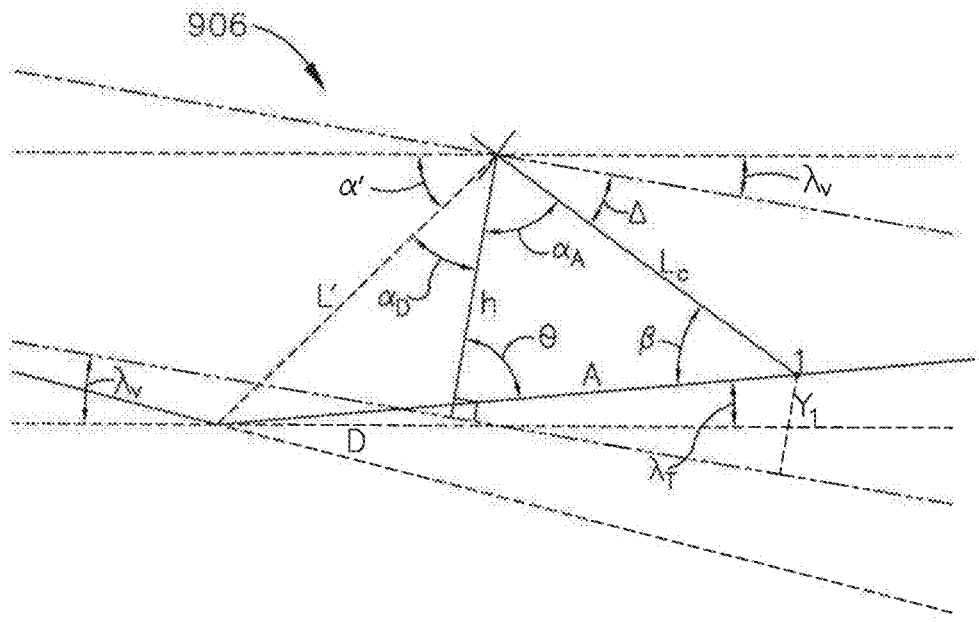
FIG. 9F illustrates a detail view of the geometric graph of FIG. 9E.

FIGS. 9E-9F illustrates graphs 905-906 for Value D less than zero, Vehicle angle negative: Derivation—From FIG. 9F:

$$\Delta = 90 - \alpha_A \quad (31)$$

$$\alpha_A = 180 - \theta - \beta \quad (32)$$

$$\theta = 90 - \lambda_T - |\lambda_V| \quad (33)$$

Use the law of Sines to find β:

$$\frac{h}{\sin\beta} = \frac{A}{\sin\alpha_A} = \frac{L_c}{\sin\theta} \quad (34)$$

Solve for β

$$h\sin\theta = L_c \sin\beta \quad (35)$$

$$\sin\beta = \frac{h\sin\theta}{L_c} \quad (36)$$

$$\beta = \sin^{-1}\left[\frac{h\sin(90 - \lambda_T - |\lambda_V|)}{L_c}\right] \quad (37)$$

Therefore $$\Delta = 90 - \alpha_A \quad (38)$$

Where $$\alpha_A = 180 - \theta - \beta \quad (39)$$

$$\theta = 90 - \lambda_T - \lambda_V \quad (40)$$

$$\beta = \sin^{-1}\left[\frac{h\sin(90 - \lambda_T - |\lambda_V|)}{L_c}\right] \quad (41)$$

Figure 9H:
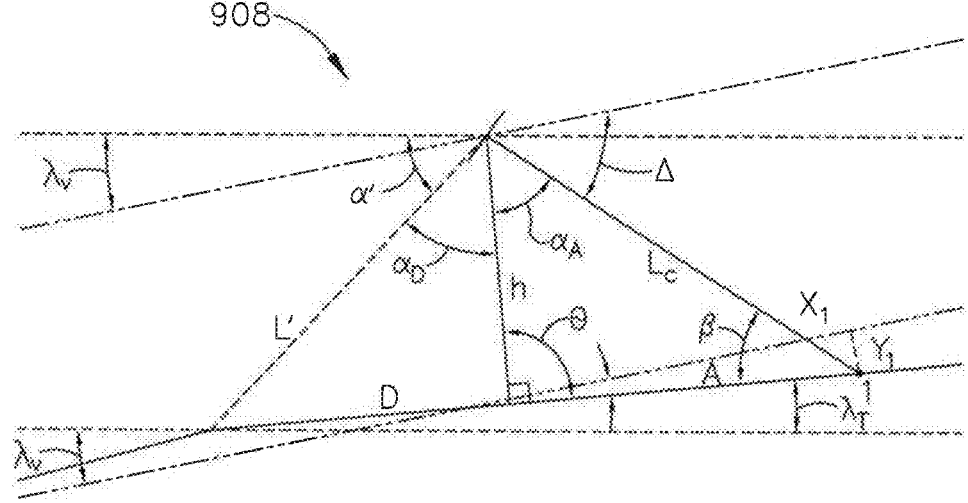
FIG. 9H illustrates a detail view of the geometric graph of FIG. 9G.
Figure 9G:
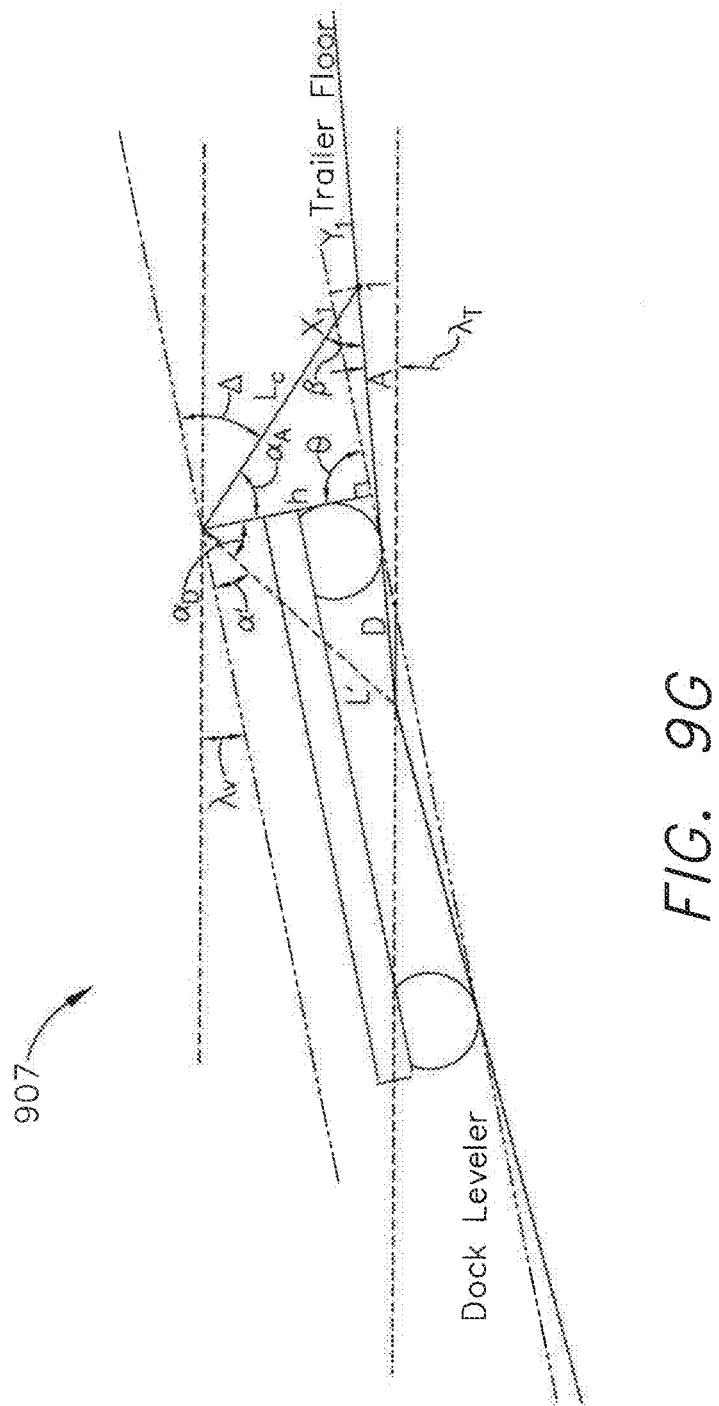
FIG. 9G illustrates a geometric graph of the robotic carton unloader straddling an inclining dock leveler and an inclining trailer floor that has a lower pitch than the dock leveler.

FIGS. 9G-9H illustrates graphs 907-908 for Value D less than zero, Vehicle angle positive: Derivation—From FIG. 9H:

$$\gamma = \Delta_V - \lambda_T \quad (42)$$

$$\theta = 90 + \gamma \quad (43)$$

$$\theta = 90 + \lambda_V - \lambda_T \quad (44)$$

Use the law of Sines to find β:

$$\frac{h}{\sin\beta} = \frac{A}{\sin\alpha_A} = \frac{L_c}{\sin\theta} \quad (45)$$

$$\sin\beta = \frac{h\sin\theta}{L_c} \quad (46)$$

-continued $$\beta = \sin^{-1}\left[\frac{h\sin(\theta)}{L_c}\right] \quad (47)$$

Find $\alpha_A$ $$\alpha_A = 180 - \beta - \theta \quad (48)$$

Finally find $\Delta$ $$\Delta = 90 - \alpha_A \quad (49)$$

Therefore $$\Delta = 90 - \alpha_A \quad (50)$$

Where $$\alpha_A = 180 - \beta - \theta \quad (51)$$

$$\beta = \sin^{-1}\left[\frac{h\sin(\theta)}{L_c}\right] \quad (52)$$

And $$\theta = 90 + \lambda_Y - \lambda_T \quad (53)$$

Figure 10:
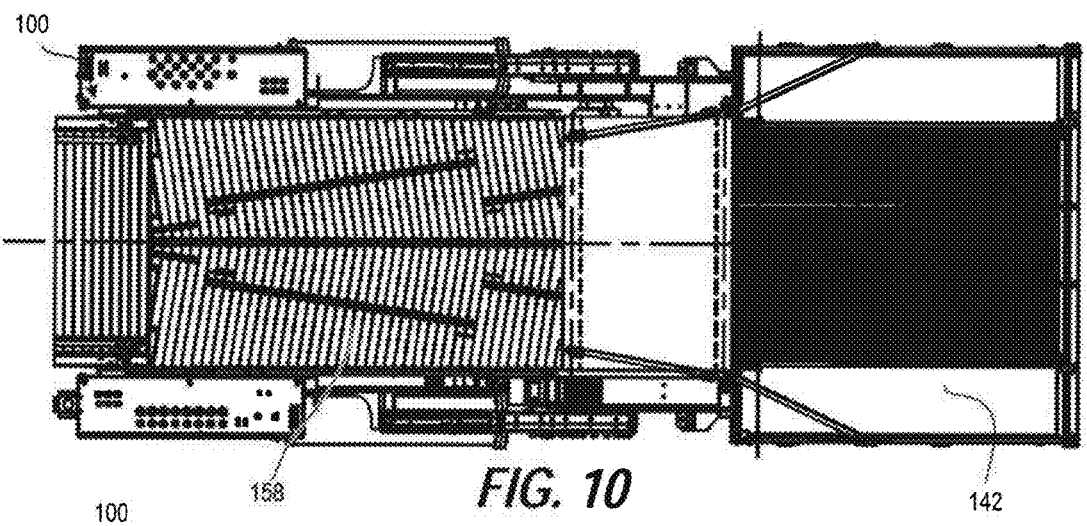
FIG. 10 illustrates a top view of the robotic carton unloader of FIG. 1 with the forward portion of the conveyor system centered, according to one or more embodiments.
Figure 11:
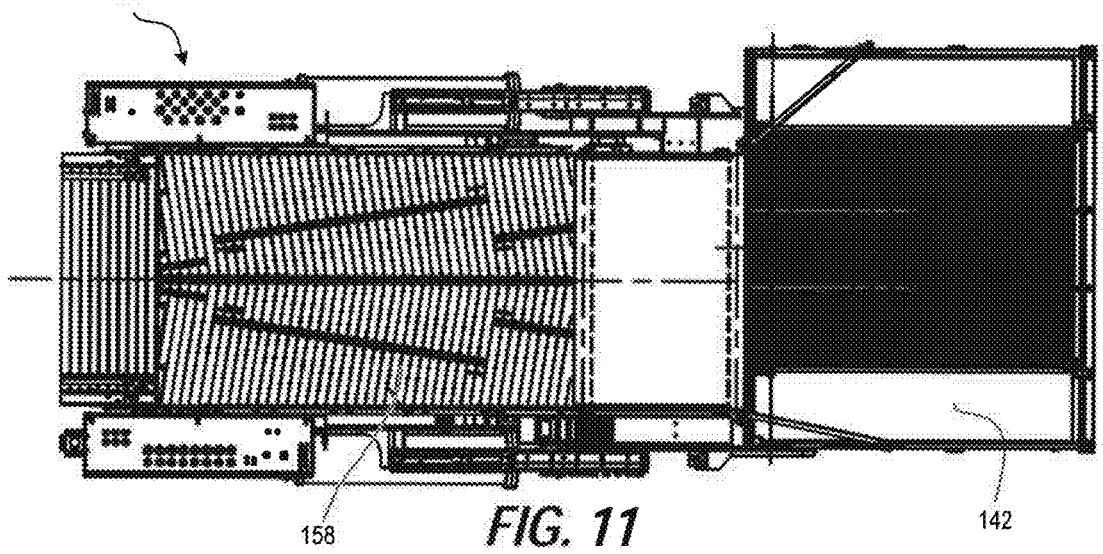
FIG. 11 illustrates a top view of the robotic carton unloader of FIG. 1 with the forward portion of the conveyor system laterally shifted, according to one or more embodiments.
Figure 12:
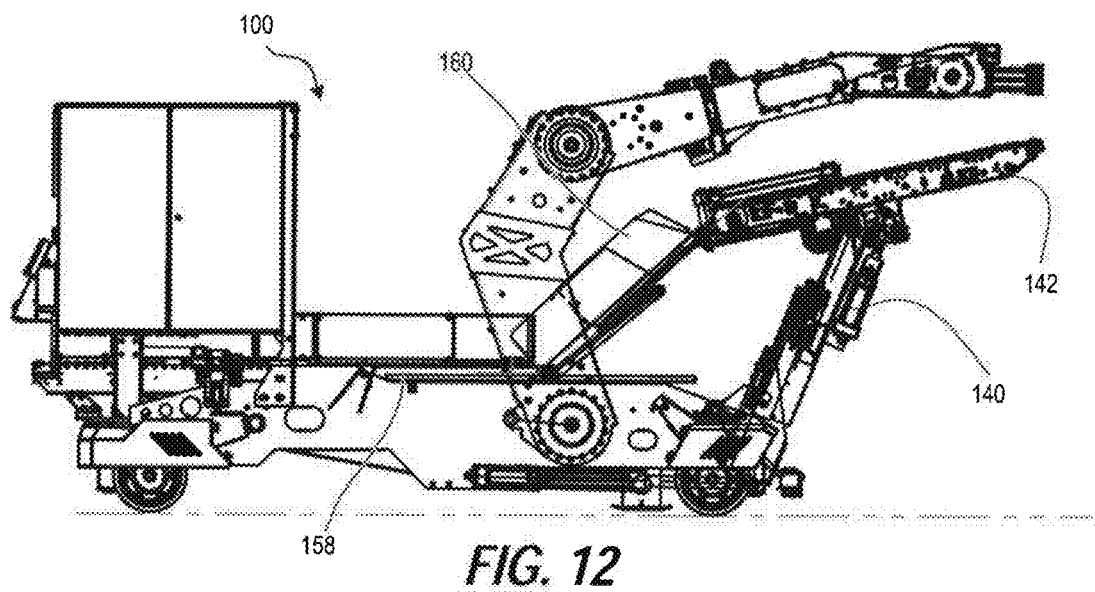
FIG. 12 illustrates a side view of the robotic carton unloader of FIG. 1 with a lift raised and a transition belt connecting the front and rear portions of the conveyor system, according to one or more embodiments.
Figure 13:
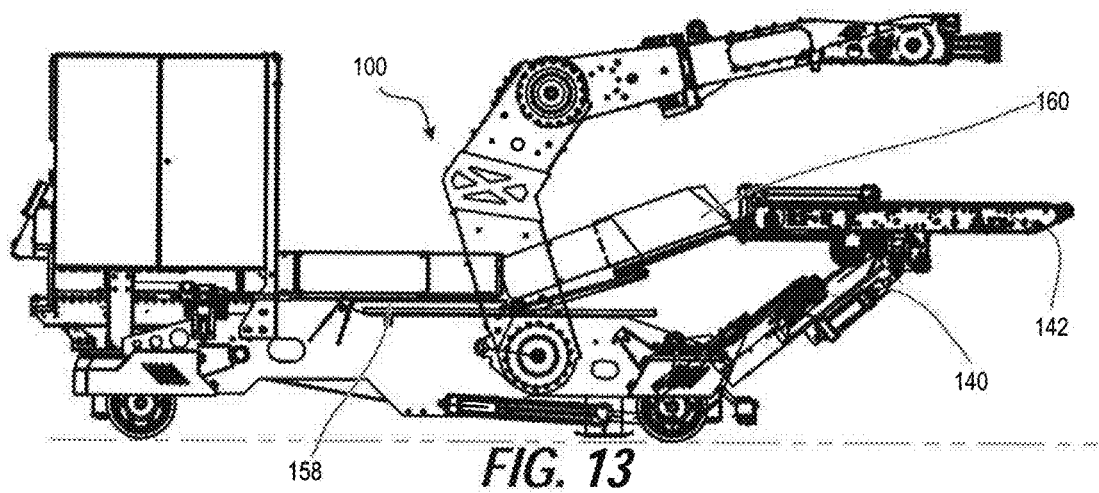
FIG. 13 illustrates a side view of the robotic carton unloader of FIG. 12 with the lift partially raised and the transition belt connecting the front and rear portions of the conveyor system, according to one or more embodiments.
Figure 14:
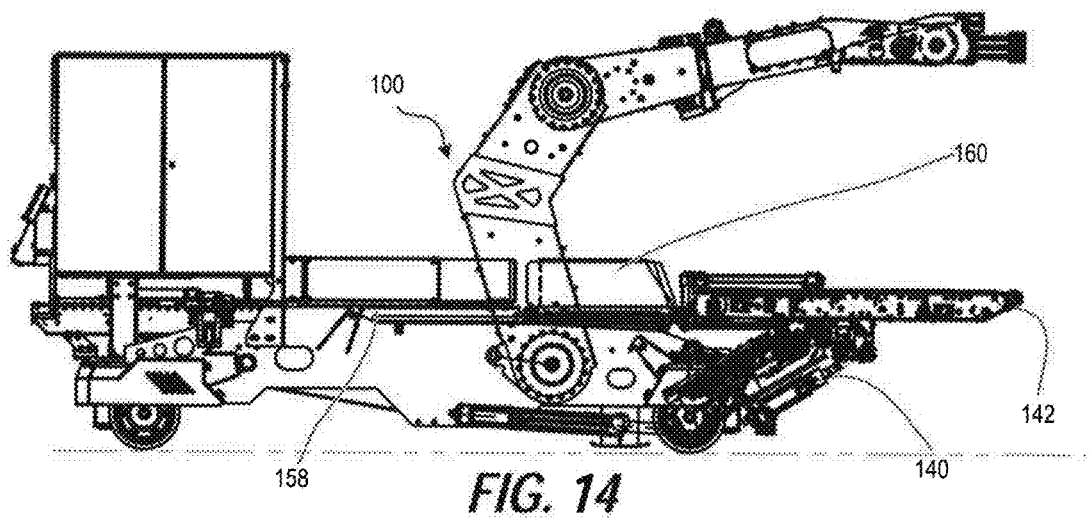
FIG. 14 illustrates a side view of the robotic carton unloader of FIG. 12 with the lift lowered and level and the transition belt connecting the front and rear portions of the conveyor system, according to one or more embodiments.

In one or more embodiments, FIGS. 10-11 illustrate that the front portion 142 of the conveyor system 100 can be laterally positionable to mirror lateral positioning of the manipulator head 136 (FIG. 2). FIG. 10 illustrates the front portion 142 centered. FIG. 11 illustrates the front portion 142 laterally translated to one side.

Figure 15:
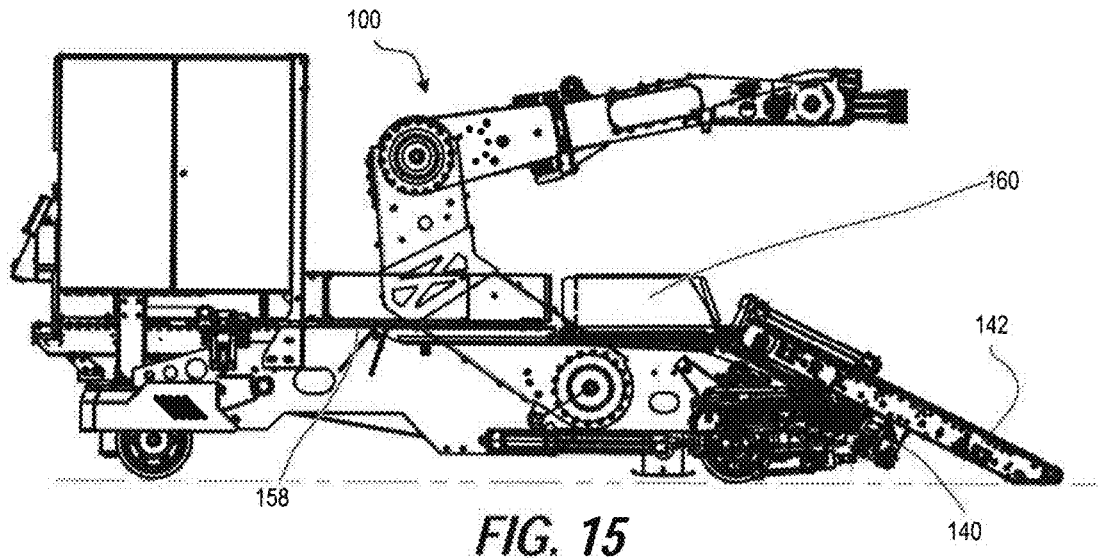
FIG. 15 illustrates a side view of the robotic carton unloader of FIG. 12 with the lift lowered and tilted and the transition belt connecting the front and rear portions of the conveyor system, according to one or more embodiments.

FIGS. 12-15 illustrate the robotic carton unloader 100 including an expandable transition belt 160 that maintains a conveying path between the front portion 142 and the rear portion 158 of the conveying system 110. The ability to convey cartons is retained when the lift 140 is raised to a fully-up position (FIG. 12), a mid-position (FIG. 13), when the lift 140 is retracted and level (FIG. 14), and when the front portion 142 is rotated downward (FIG. 15). The transition belt 160 can be configured adjust its length such that even at a highest point of the lift 140 that the cartons can be conveyed without tumbling.

Figure 16:
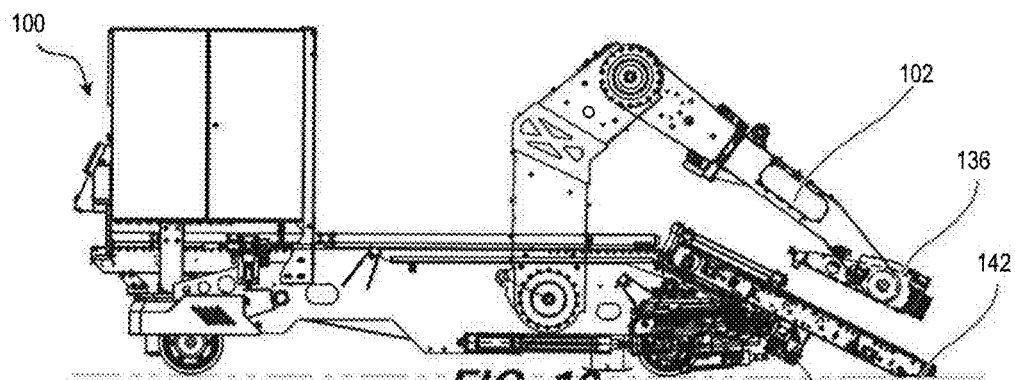
FIG. 16 illustrates a side view of the robotic carton unloader of FIG. 1 with the lift lowered and tilted down to shadow a manipulator head of the robotic arm assembly reaching a bottom row of cartons, according to one or more embodiments.
Figure 17:
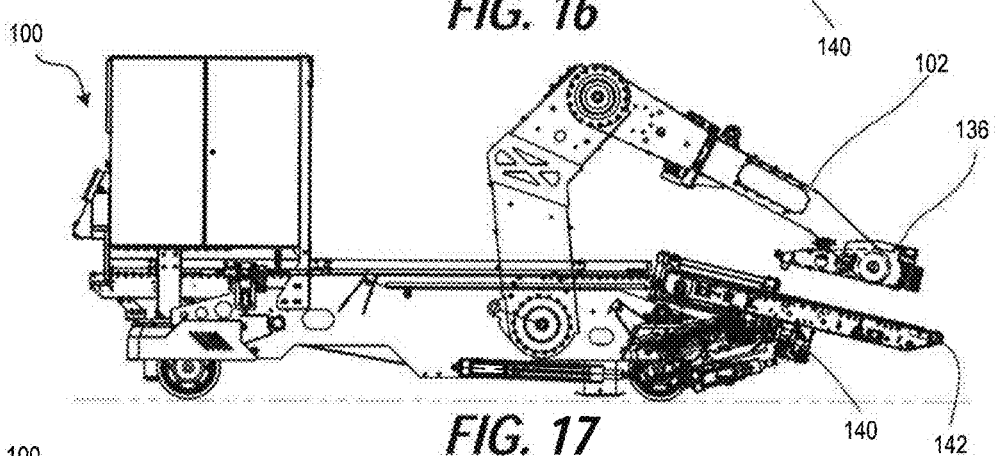
FIG. 17 illustrates a side view of the robotic carton unloader of FIG. 1 with the lift lowered and partially tilted down to shadow the manipulator head of the robotic arm assembly reaching a slightly higher row of cartons, according to one or more embodiments.
Figure 18:
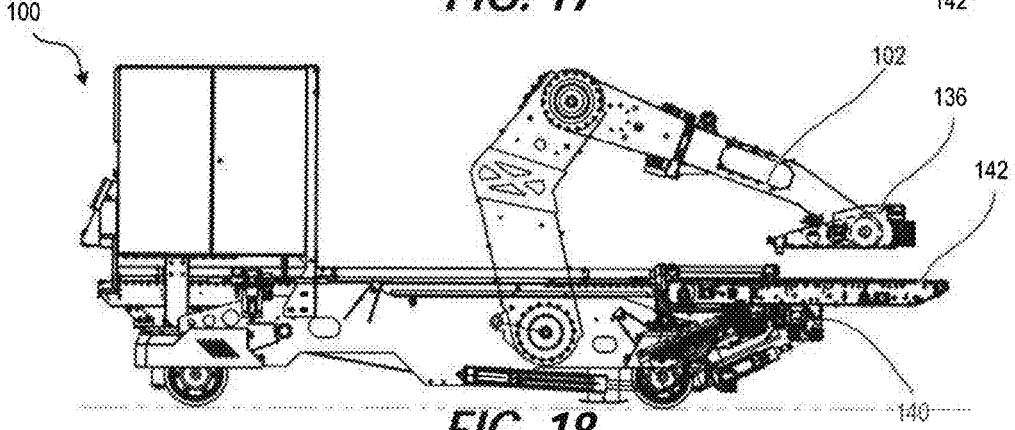
FIG. 18 illustrates a side view of the robotic carton unloader of FIG. 1 with the lift lowered and level to shadow the manipulator head of the robotic arm assembly reaching a yet higher row of cartons, according to one or more embodiments.
Figure 19:
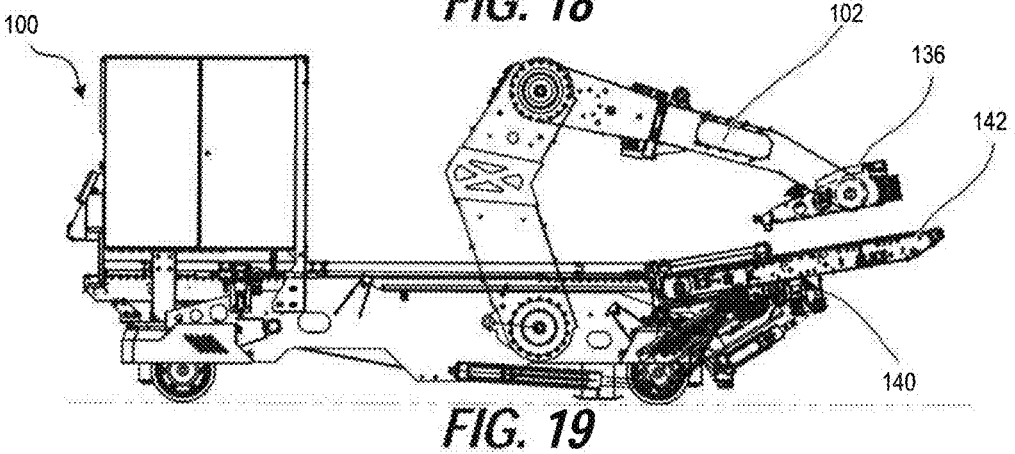
FIG. 19 illustrates a side view of the robotic carton unloader of FIG. 1 with the lift lowered and partially tilted up to shadow the manipulator head of the robotic arm assembly reaching a yet higher row of cartons, according to one or more embodiments.
Figure 20:
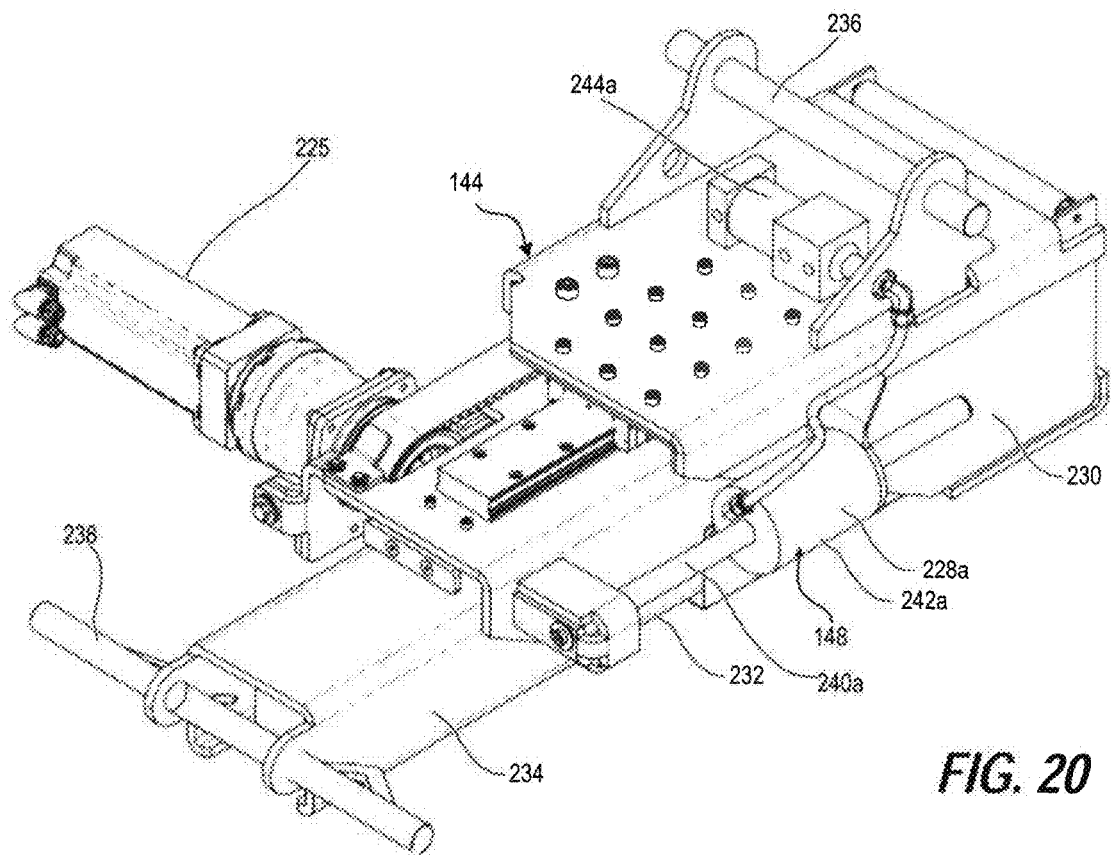
FIG. 20 illustrates a front isometric view of a telescoping beam in an extended state and having a boom locking mechanism of the robotic carton unloader of FIG. 1, according to one or more embodiments.
Figure 21:
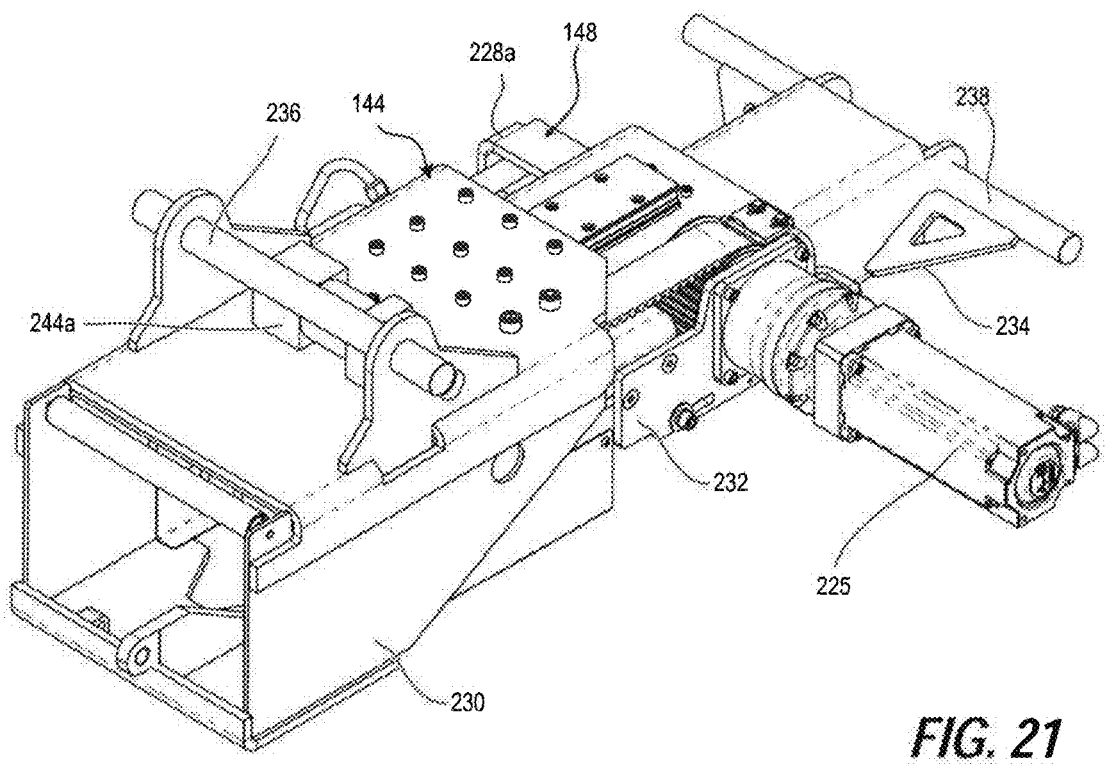
FIG. 21 illustrates a rear isometric view of the telescoping beam of FIG. 20 in an extended state and having the boom locking mechanism, according to one or more embodiments.
Figure 22:
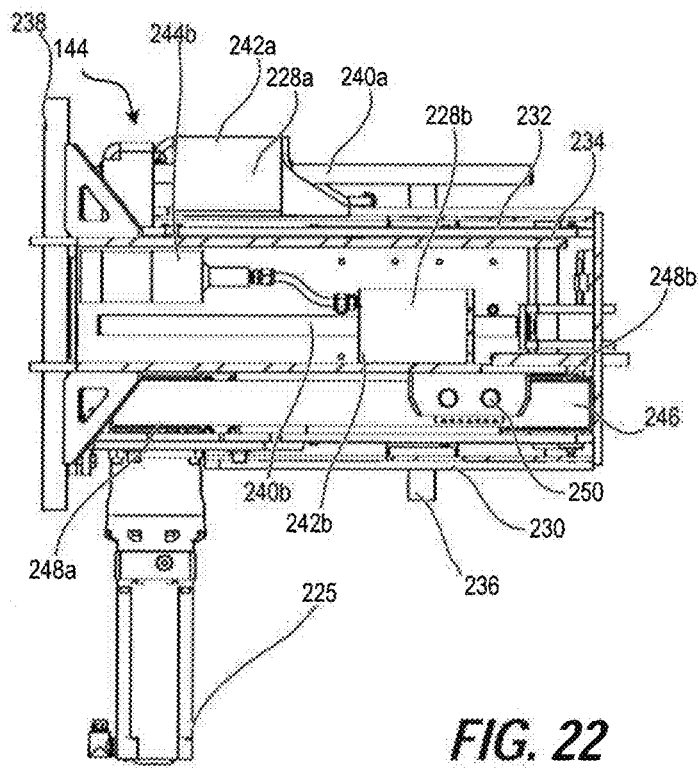
FIG. 22 illustrates a longitudinal cutaway view of the telescoping beam of FIG. 20 in a fully retracted state, according to one or more embodiments.
Figure 23:
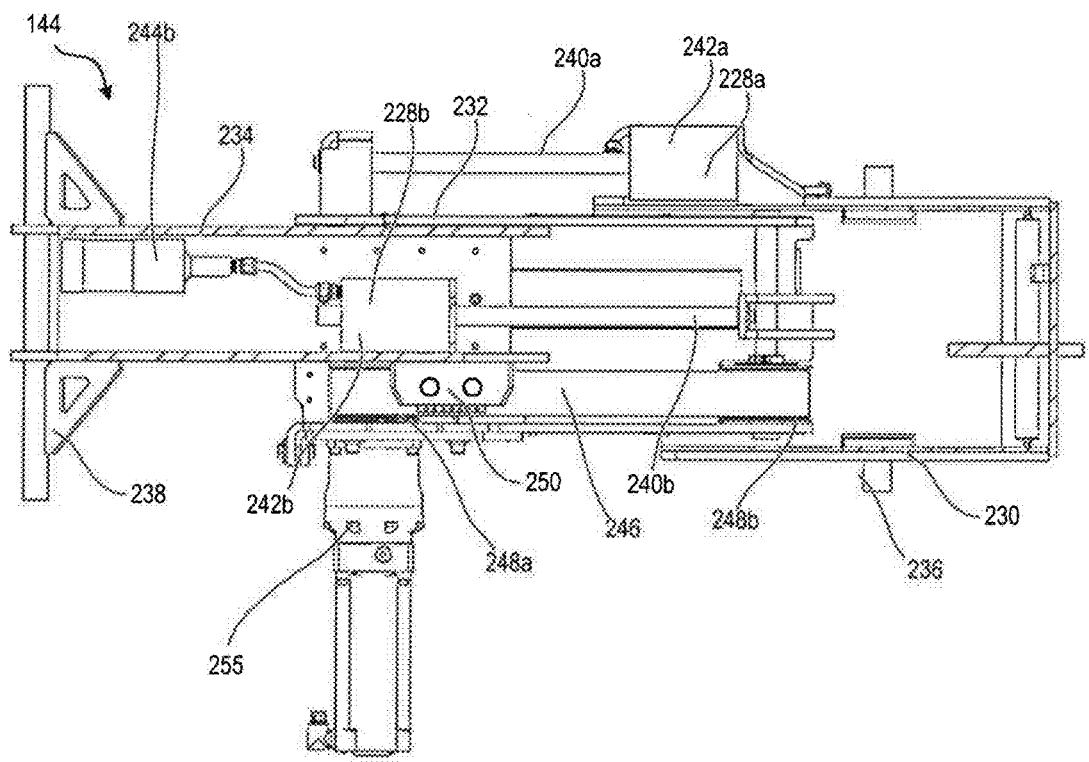
FIG. 23 illustrates a longitudinal cutaway view of the telescoping beam of FIG. 20 in a fully extended state, according to one or more embodiments.
Figure 24:
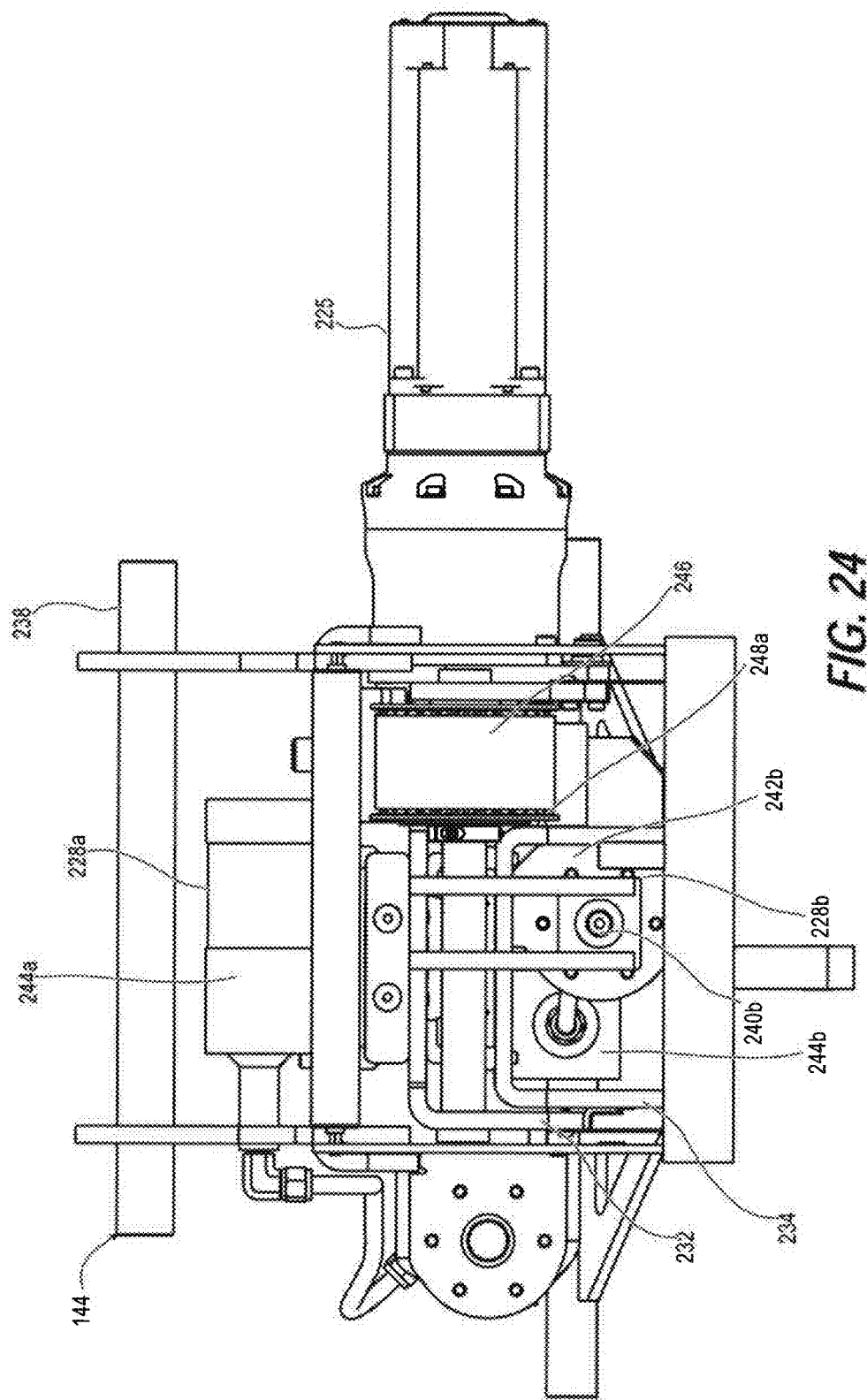
FIG. 24 illustrates a rear cutaway view of the telescoping beam of FIG. 20, according to one or more embodiments.

FIGS. 16-19 illustrate that the and the lift 140 can raise and tilt the forward portion of the conveyor system 110 of the robotic carton unloader 100 to shadow the positioning of the manipulator head 136 by the robotic arm assembly 102. Thereby, a carton 104 (FIG. 1) can be gently dragged from a carton pile 106 (FIG. 1) to the conveyor system 110 without dropping any significant distance. The manipulator head 136 need not engage more than a rear face of a carton. In addition, the design weight of what should be distally supported by the robotic arm assembly 102 can be reduced. FIG. 16 illustrates the front portion 142 full retracted and tipped to ground level to receive a carton drawn upward from a bottom row of the carton pile (not shown). FIG. 17 illustrates the front portion 142 full retracted but only partially tipped to receive from a low but not bottom row of the carton pile. FIG. 18 illustrates the front portion 142 full retracted but level to receive a slightly higher row. FIG. 19 illustrates the front portion 142 full retracted but tipped upwardly to receive from yet a higher row. It should be appreciated that higher positions can be reached by extending the lift 140.

FIGS. 20-24 illustrate the telescoping beam 144 having a locking boom mechanism 148 that includes two linear gripping devices 228a, 228b (FIGS. 22-23) which each apply a normal force to develop a frictional holding force upon an object or surface which is not permanently fixed. In an exemplary embodiment, the telescoping beam 144 has a first stage 230, a second stage 232, and a third stage 234. The first stage 230 attaches for pivoting movement to the mobile body 114 (FIG. 1) and has a mounting fixture 236 for mounting one end of the nose tilting hydraulic actuator 227 (FIG. 2). The second stage 232 includes mounting of the drive belt motor 225. The third stage 234 includes a pivot yoke 238 to which the front portion 142 of the conveyor system 110 is pivotally mounted. The outer linear gripping device 228a has an upwardly extended locking rod 240a that is attached to move with the second stage 232 and received for sliding movement within a rod lock 242a attached to the first stage 230. The inner linear gripping device 228b (FIGS. 22-23) has a downwardly extended locking rod 240b that is also attached to move with the second stage 232 and received for sliding movement within a rod lock 242b attached to the third stage 230. The gripping force within each rod lock 242a-242b is normally applied by a mechanical spring (not shown) and only released when movement is required. The force is may be released by fluid pressure, mechanical means, or electromotive device. To generate higher fluid pressures a self-contained and closed pressure booster cylinders 244a-244b (FIG. 24) is used for first and third stages 230, 234. The booster cylinder converts line pressure compressed air energy to incompressible hydraulic fluid energy allowing for higher clamping forces in a compact gripping device by the use of stiffer springs. Using a pressure booster in this application is ideal since the fluid reciprocates in the system and does not flow. A finite volume of hydraulic fluid reciprocates and the booster is sized to have additional capacity. A drive belt 246 received on upper and lower pulleys 248a-248b in the second stage 232 is driven by the drive belt motor 225. Mounting blocks 250 (FIGS. 22-23) are attached respectively to the first and third stages 230, 234 and are mounted to opposite sides of the drive belt 246 to create relative movement either toward each other or away from other depending on the direction of rotation.

Figure 25:
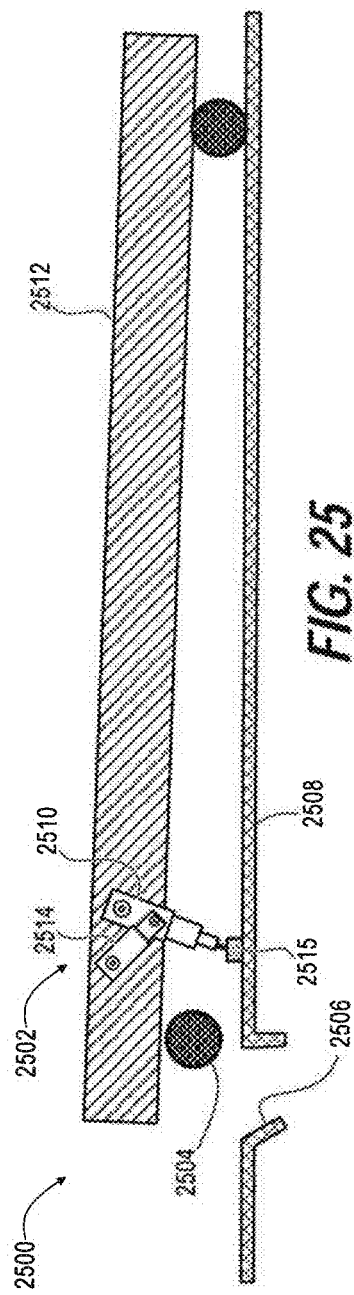
FIG. 25 illustrates a simplified side view of a robotic carton unloader raised by a built-in jacking apparatus, according to one or more embodiments.
Figure 26:
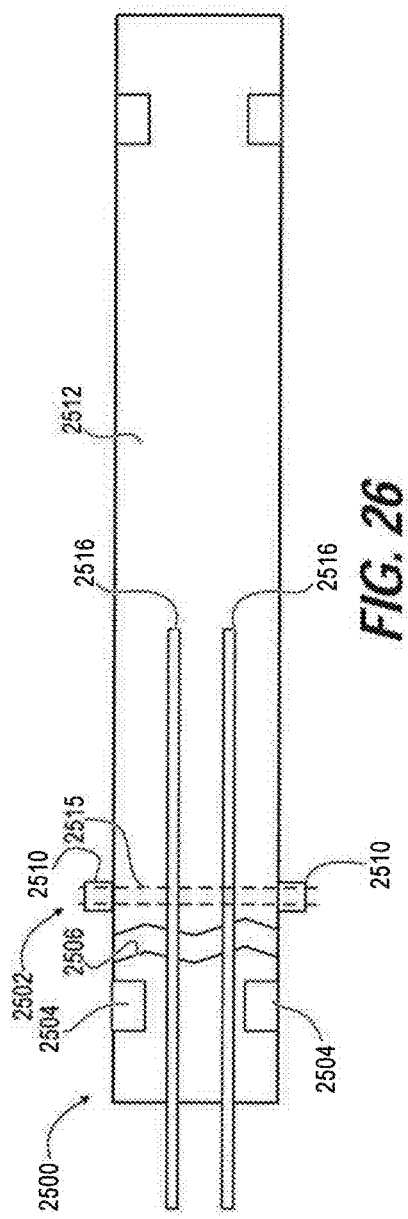
FIG. 26 illustrates a simplified top view of the robotic carton unloader of FIG. 25 raised by the built-in jacking apparatus, according to one or more embodiments.

FIGS. 25-26 illustrates a mobile carton unloader 2500 having a built-in jacking apparatus 2502 that can raise a wheel 2504 out of a damaged section 2506 of a floor 2508 to enable extraction of the mobile carton unloader 2500. A telescoping jack 2510 of the built-in jacking apparatus 2502 is pivotally attached to a mobile body 2512 of the mobile carton unloader 2500. A second actuator 2514 is pivotally attached to the mobile body 2512 and to the telescoping jack 2510 to impart a longitudinal movement to the mobile body 2512 once the telescoping jack 2510 raises the wheel 2504 out of the damaged section 2506. FIG. 26 illustrates that the telescoping jack apparatus 2502 can have telescoping jacks 2510 mounted on opposite lateral sides of the mobile body 2512 and that a foot 2515 can be square tube stock laterally connected across the lower ends of both telescoping jacks 2510. Before extending the built-in jacking apparatus 2502, longitudinally placed supports 2516 can be placed over the damaged section 2506 to enable the built-in jacking apparatus 2502 to walk across the damaged section 2506. Alternatively, the mobile body 2512 can be pulled across.

Figure 27:
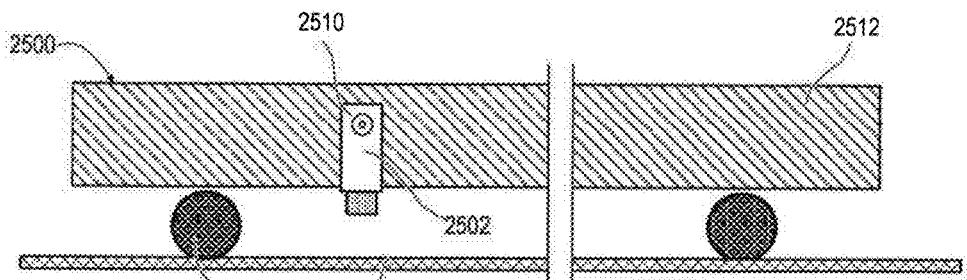
FIG. 27 illustrates a simplified top view of the robotic carton unloader of FIG. 25 in a nominal state, according to one or more embodiments.
Figure 28:
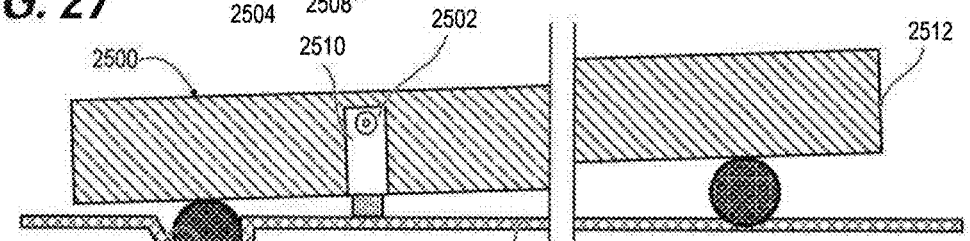
FIG. 28 illustrates a simplified top view of the robotic carton unloader of FIG. 27 having a wheel that passed through the floor, according to one or more embodiments.
Figure 29:
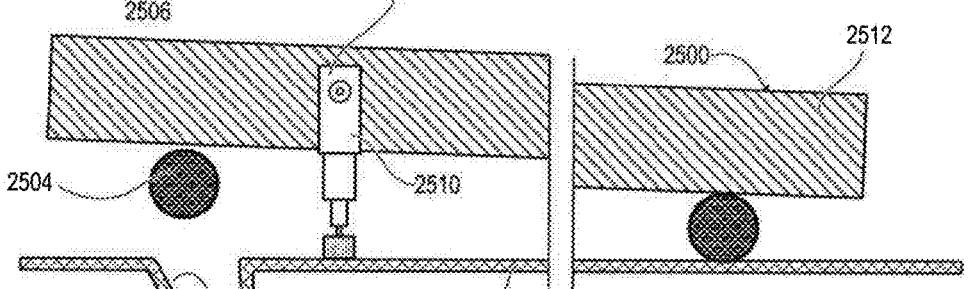
FIG. 29 illustrates a simplified top view of the robotic carton unloader of FIG. 28 with a built-in jacking apparatus extended to raise the wheel out of the floor, according to one or more embodiments.
Figure 30:
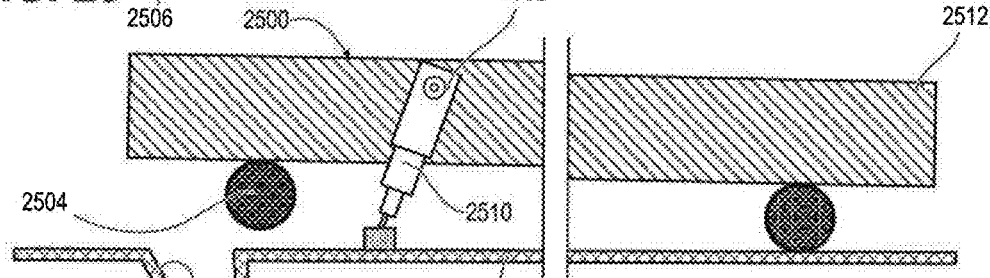
FIG. 30 illustrates a simplified top view of the robotic carton unloader of FIG. 29 with the built-in jacking apparatus extended and partially canted longitudinally move the wheel away from a damaged section of the floor, according to one or more embodiments.
Figure 31:
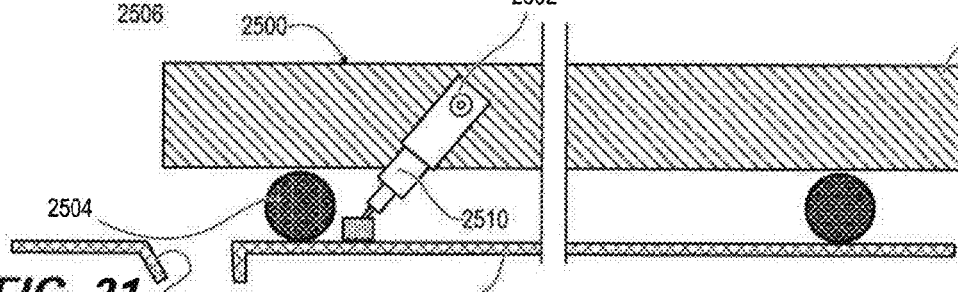
FIG. 31 illustrates a simplified top view of the robotic carton unloader of FIG. 30 with the built-in jacking apparatus extended and fully canted to further longitudinally move and lower the wheel to an undamaged section of the floor, according to one or more embodiments.

FIGS. 27-31 illustrate the built-in jacking apparatus 2502 being used to reposition the mobile carton unloader 2500. FIG. 27 illustrates the mobile carton unloader 2500 in a nominal state with the built-in jacking apparatus 2502 retracted and the mobile body 2512 supported on the floor 2508 by wheels 2504. FIG. 28 illustrates a wheel 2504 falling through the floor 2508, preventing normal movement of the mobile carton unloader 2500. FIG. 29 illustrates the telescoping jack 2510 being extended to raise the wheel 2504 out of the damaged section 2506 of the floor 2508. FIG. 30 illustrates the mobile body 2512 being longitudinally moved away from the damaged section 2506, still supported by a canted telescoping jack 2510. FIG. 31 illustrates additional longitudinal movement of the mobile body 2512 that causes further canting of the telescoping jack 2510 and corresponding lowering of the mobile body 2512 until supported by the wheel 2504.

Figure 32:
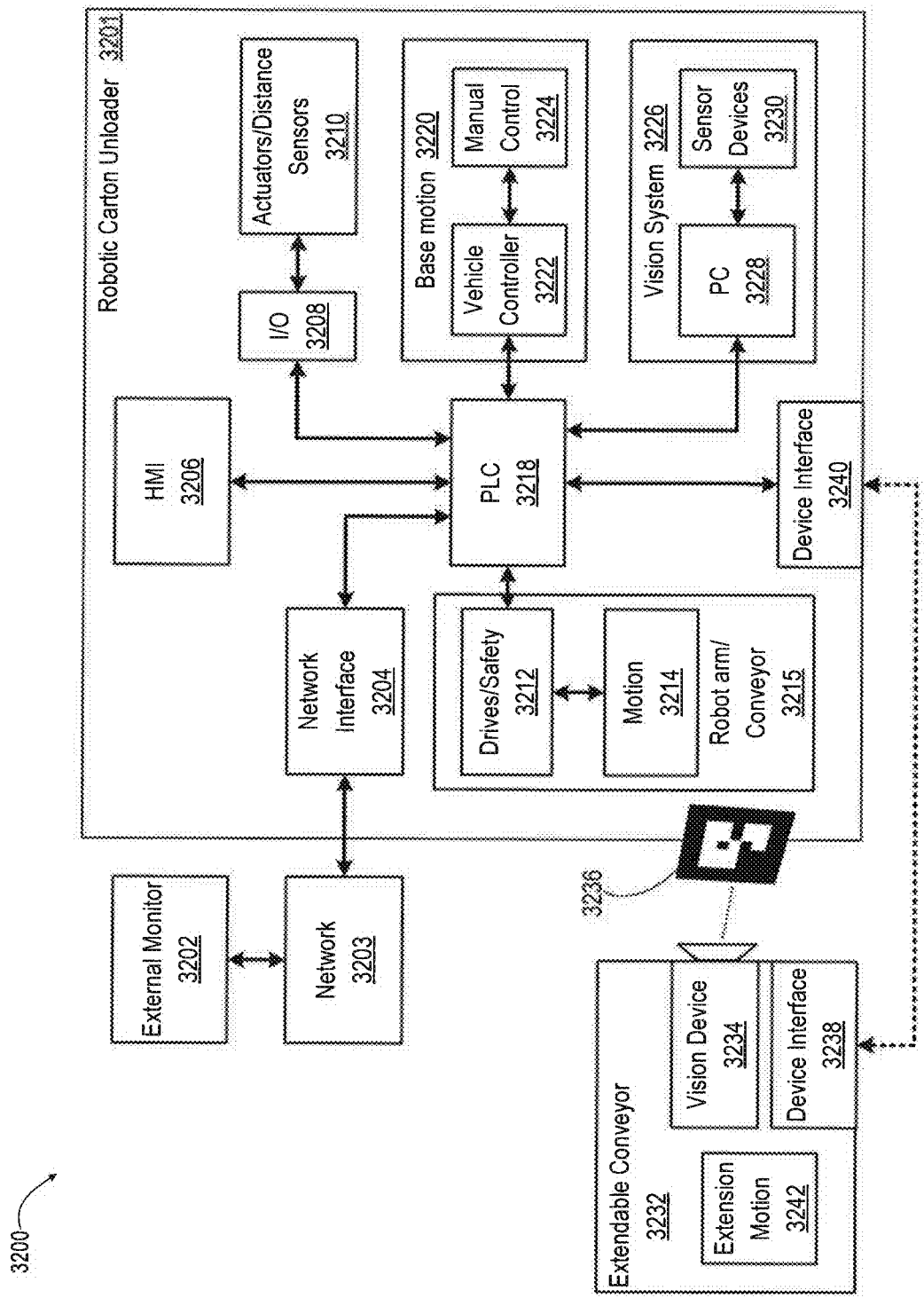
FIG. 32 illustrates an exemplary computing environment for an onboard unloading controller of the robotic carton unloader of FIG. 1, according to one or more embodiments.

FIG. 32 illustrates exemplary components of a robotic carton unloader 3201 suitable for use in various embodiments. The robotic carton unloader 3201 may include an external monitor 3202, a network interface module 3204, an HMI module 3206, an input/output module (I/O module 3208), an actuators/distance sensors module 3210, a robotic arm and a conveyor system 3215 that includes a drives/safety module 3212 and a motion module 3214, a programmable logic controller (or PLC 3218), a base motion module 3220 that includes a vehicle controller module 3222 and a manual control module 3224, and a vision system 3226 (or visualization system) that may include one or more computing devices 3228 (or "PCs") and sensor devices 3230. In some embodiments, vision system 3226 of the robotic carton unloader 3201 may include a PC 3228 connected to each sensor device 3230. In embodiments in which more than one sensor device 3230 is present on the robotic carton unloader 3201, the PCs 3228 for each sensor device 3230 may be networked together and one of the PC's 3228 may operate as a master PC 3228 receiving data from the other connected PC's 3228, may perform data processing on the received data and its own data (e.g., coordinate transformation, duplicate elimination, error checking, etc.), and may output the combined and processed data from all the PCs 3228 to the PLC 3218. In some embodiments, the network Interface module 3204 may not have a PLC inline between it and the PC 3228, and the PLC 3218 may serve as the Vehicle Controller and/or Drives/Safety system.

The robotic carton unloader 3201 may connect to remote locations or systems with a network interface module 3204 (e.g., a Wi-Fi™ radio, etc.) via a network 3203, such as a local area Wi-Fi™ network. In particular, the network interface module 3204 may enable the robotic carton unloader 3201 to connect to an external monitor 3202. The external monitor 3202 may be anyone of a remote warehouse or distribution center control room, a handheld controller, or a computer, and may provide passive remote viewing through the vision system 3226 of the robotic carton unloader 3201. Alternately, the external monitor 3202 may override the programming inherent in the vision system 3226 and assume active command and control of the robotic carton unloader 3201. Programming for the robotic carton unloader 3201 may also be communicated, operated and debugged through external systems, such as the external monitor 3202. Examples of an external monitor 3202 that assumes command and control may include a remotely located human operator or a remote system, such as a warehouse or distribution server system (i.e., remote device as described above). Exemplary embodiments of using an external monitor 3202 to assume command and control of the robotic carton unloader 3201 may include human or computer intervention in moving the robotic carton unloader 3201, such as from one unloading bay to another, or having the external monitor 3202 assume control of the robotic arm to remove an item (e.g., box, carton, etc.) that is difficult to unload with autonomous routines. The external monitor 3202 may include any of: a visual monitor, a keyboard, a joystick, an I/O port, a CD reader, a computer, a server, a handheld programming device, or any other device that may be used to perform any part of the above described embodiments.

The robotic carton unloader 3201 may include a human machine interface module 3206 (or HMI module 3206) that may be used to control and/or receive output information for the robot arm and conveyor system 3215 and/or the base motion module 3220. The HMI module 3206 may be used to control (or may itself include) a joystick, a display, and a keypad that may be used for re-programming, over-riding the autonomous control of the machine, and driving the robotic carton unloader 3201 from point to point. The actuators 3210 that may be actuated individually or in any combination by the vision system 3226, and the distance sensors may be used to assist in guiding the robotic carton unloader 3201 into an unloaded area (e.g., a trailer). The I/O module 3208 may connect the actuators and distance sensors 3210 to the PLC 3218. The robotic arm and conveyor system 3215 may include all components needed to move the arm and/or the conveyor, such as drives/engines and motion protocols or controls. The base motion module 3220 may be the components for moving the entirety of the robotic carton unloader 3201. In other words, the base motion module 3220 may be the components needed to steer the vehicle into and out of unloading areas.

The PLC 3218 that may control the overall electromechanical movements of the robotic carton unloader 3201 or control exemplary functions, such as controlling the robotic arm or a conveyor system 3215. For example, the PLC 3218 may move the manipulator head of the robotic arm into position for obtaining items (e.g., boxes, cartons, etc.) from a wall of items. As another example, the PLC 3218 may control the activation, speed, and direction of rotation of kick rollers, and/or various adjustments of a support mechanism configured to move a front-end shelf conveyor (e.g., front-end shelf conveyor 6412). The PLC 3218 and other electronic elements of the vision system 3226 may mount in an electronics box (not shown) located under a conveyor, adjacent to a conveyor, or elsewhere on the robotic carton unloader 3201. The PLC 3218 may operate all or part of the robotic carton unloader 3201 autonomously and may receive positional information from the distance sensors 3210. The I/O module 3208 may connect the actuators and the distance sensors 3210 to the PLC 3218.

The robotic carton unloader 3201 may include a vision system 3226 that comprises sensor devices 3230 (e.g., cameras, microphones, 3D sensors, etc.) and one or more computing device 3228 (referred to as a personal computer or "PC" 3228). The robotic carton unloader 3201 may use the sensor devices 3230 and the one or more PC 3228 of the vision system 3226 to scan in front of the robotic carton unloader 3201 in real time or near real time. The forward scanning may be triggered by the PLC 3218 in response to determining the robotic carton unloader 3201, such as a trigger sent in response to the robotic carton unloader 3201 being in position to begin detecting cartons in an unloading area. The forward scanning capabilities may be used for collision avoidance, sent to the human shape recognition (safety), sizing unloaded area (e.g., the truck or trailer), and for scanning the floor of the unloaded area for loose items (e.g., cartons, boxes, etc.). The 3D capabilities of the vision system 3226 may also provide depth perception, edge recognition, and may create a 3D image of a wall of items (or carton pile). The vision system 3226 may operate alone or in concert with the PLC 3218 to recognize edges, shapes, and the near/far distances of articles in front of the robotic carton unloader 3201. For example the edges and distances of each separate carton in the wall of items may be measured and calculated relative to the robotic carton unloader 3201, and vision system 3226 may operate alone or in concert with the PLC 3218 to may select specific cartons for removal.

In some embodiments, the vision system 3226 may provide the PLC with information such as: specific XYZ coordinate locations of cartons targeted for removal from the unloading area, and one or more movement paths for the robotic arm or the mobile body of the robotic carton unloader 3201 to travel. The PLC 3218 and the vision system 3226 may work independently or together such as an iterative move and visual check process for carton visualization, initial homing, and motion accuracy checks. The same process may be used during vehicle movement, or during carton removal as an accuracy check. Alternatively, the PLC 3218 may use the move and visualize process as a check to see whether one or more cartons have fallen from the carton pile or repositioned since the last visual check. While various computing devices and/or processors in FIG. 32, such as the PLC 3218, vehicle controller 3222, and PC 3228, have been described separately, in the various embodiments discussed in relation to FIG. 32 and all the other embodiments described herein, the described computing devices and/or processors may be combined and the operations described herein performed by separate computing devices and/or processors may be performed by less computing devices and/or processors, such as a single computing device or processor with different modules performing the operations described herein. As examples, different processors combined on a single circuit board may perform the operations described herein attributed to different computing devices and/or processors, a single processor running multiple threads/modules may perform operations described herein attributed to different computing devices and/or processors, etc.

An extendable conveyor system 3232 can convey articles from the robotic carton unloader 3201 to other portions of a material handling system 3200. As the robotic carton unloader 3201 advances or retreats, a vision device 3234 on one or the extendable conveyor 3232 and robotic carton unloader 3201 can image a target 3236 on the other. Vision system 3226 can perform image processing to detect changes in size, orientation and location of the target 3236 within the field of view of the vision device 3236. Device interfaces 3238, 3240 respectively of the extendable conveyor system 3232 and the robotic carton unloader 3201 can convey vision information or movement commands. For example, PLC 3218 can command an extension motion actuator 3242 on the extendable conveyor 3232 to correspond to movements of the robotic carton unloader 3201 to keep the extendable conveyor system 3232 and the robotic carton unloader 3201 in alignment and in proper spacing. In one embodiment, the device interfaces 3238, 3240 utilize a short range wireless communication protocol such as a Personal Access Network (PAN) protocol. Examples of PAN protocols which may be used in the various embodiments include Bluetooth®, IEEE 802.15.4, and Zigbee® wireless communication protocols and standards.

In a proof of concept test, a POINTGREY camera was used to track a black and white Augmented Reality (AR)-tag target that is similar to a Quick Response (QR) code. The dimensions of the target used were 75 mm×75 mm and the working distance from the camera to the tag varied from 0.4 m to 1 m. a 2.3 MP GigE POE Blackfly (Sony IMX136) (Part Number: BFLY-PGE-23S2C-CS) RGB (Red-Green-Blue) camera was used for the study. The camera supported the Robot Operating System (ROS). Optics used was Edmund 5 mm FL Wide Angle Low Distortion Lens (Part Number: 68-670). The distance from the camera to the target on extendable vary from 500 mm-750 mm. To assure for maximum visibility of target, with the current set up, a horizontal FOV of 52o was required. As a result, a lens with FOV of 57° (horizontal)*37° (vertical) was chosen. Software rqt_plot from ROS.org was used to rqt_plot provide a graphical user interface (GUI) plugin for visualizing numeric values in a 2D plot using different plotting backends. ROS console showed AR-tracking and respective variations in x, y, z values in the plot. RGB image topic was provided as input to the AR-tag tracking system and ROS topic's "/pose_x" "/pose_y" "/pose_z" provided x, y, z locations of the AR-tag published frequency of 5 Hz.

For implementation in the robotic carton unloader, resultant x, y, z values can be sent to PLC. In this process, these topics are sent to the respective rosnode ("PLC_COMMAND") which are routed the message to PLC. Interfacing requirements/document to the PLC include (i) Data formatting (XYZ), (ii) Error handling/heartbeat messaging, and (iii) Handshaking. Options contemplated for hardware include different options for PC: (a) using an additional personal computer (PC) with no graphic card; (b) an embedded PC; or (c) smart camera. For POINTGREY camera, a 1 GB switch having three ports can be used respectively for the camera, PC and PLC.

The tag recognition analysis showed that this setup provides effective distance and orientation information sufficient for the PLC to maintain alignment between the extendable conveyor and the robotic carton unloader. Dynamic tracking test was conducted using RVIS* to simulate the AR-tag from which a coordinate value was obtained. For (1), frame names "ar_marker_9" were seen in the RVIS. The visual camera image moved simultaneously with the plotted coordinate. For (2), the x, y, z value was plotted against physically measured distances as shown in TABLE 1:

TABLE 1

| Real Distance(mm) | 213 | 306 | 405 | 519 | 654 | 792 | 908 | 1143 | 1301 | 1508 |
|---|---|---|---|---|---|---|---|---|---|---|
| Calculated Distance(mm) | 213.9 | 307.5 | 406.7 | 521 | 654.1 | 792.8 | 909.6 | 1147 | 1309.3 | 1525 |
| Error(mm) | −0.9 | −1.5 | −1.7 | −2 | −0.1 | −0.8 | −1.6 | −4 | −8.3 | −17 |

Figure 33:
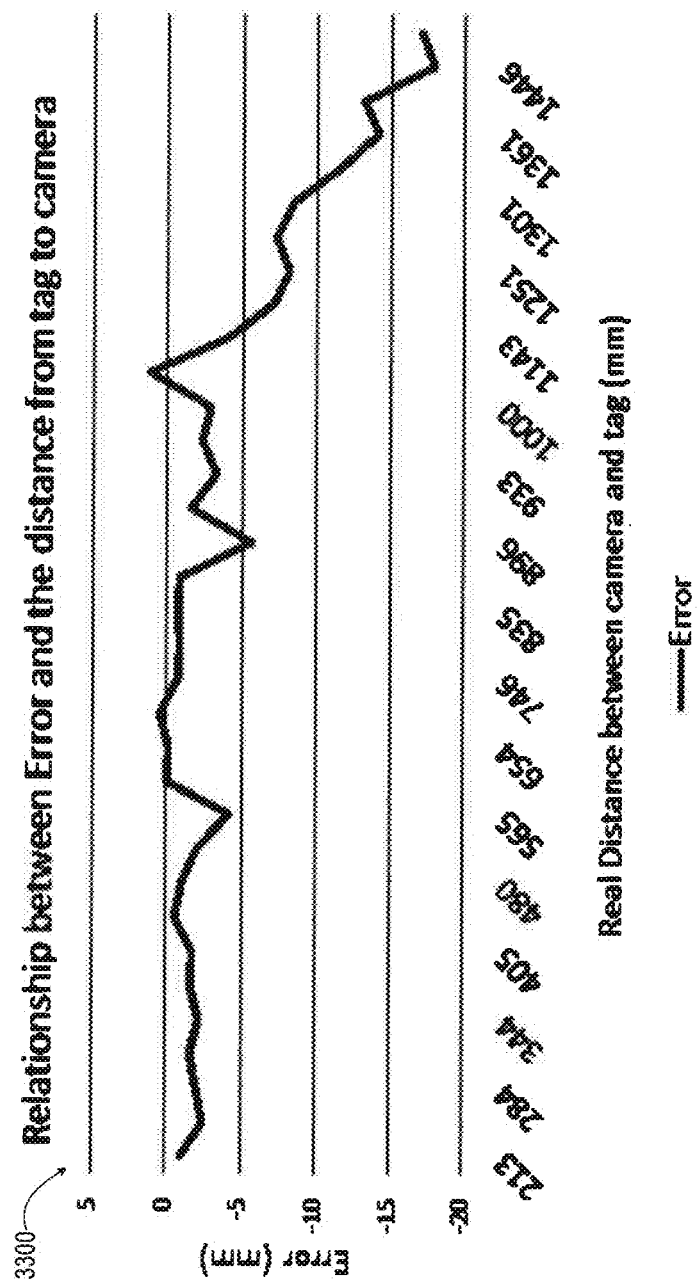
FIG. 33 illustrates a graphical plot of the relationship between error and the distance from the tag to the camera.

FIG. 33 illustrates a plot 3300 that illustrates the relationship between error and the distance from the tag to the camera. From review of the TABLE 1 and FIG. 33, indication is that (1) generally the error grows with increase in distance; and (2) when the distance is less than 1.1 m, the error is steady and less than 5 mm. When the distance is more than 1.1 m, the error increase rapidly. Implementation for the robotic carton unloader is contemplated with 0.5 to 0.75 m spacing, which would be supported by this approach.

As used herein, processors may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-Ray™ disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

For clarity, the robotic carton unloader 100 (FIG. 1) is described herein as unloading cartons, which can be corrugated boxes, wooden crates, polymer or resin totes, storage containers, etc. The manipulator head can further engage articles that are products that are shrink-wrapped together or a unitary product. In one or more embodiments, aspects of the present innovation can be extended to other types of manipulator heads that are particularly suited to certain types of containers or products. The manipulator head can employ mechanical gripping devices, electrostatic adhesive surfaces, electromagnetic attraction, etc. Aspects of the present innovation can also be employed on a single conventional articulated arm.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A robotic carton unloader for unloading a carton pile resting on a floor, comprising:
    a mobile body movable across the floor;
    a conveyor system mounted on the mobile body to convey unloaded cartons thereon; and
    a robotic arm assembly comprising:
        right and left lower arms pivotally attached at a lower end respectively to the mobile body on opposing lateral sides of the conveyor system passing there between to rotate about a lower arm axis that is perpendicular to a longitudinal axis of the conveyor system;
        an upper arm assembly having a rear end pivotally attached at an upper end respectively of the right and left lower arms to pivotally rotate about an upper arm axis that is perpendicular to the longitudinal axis of the conveyor system and parallel to the lower arm axis; and
        a manipulator head attached to a front end of the upper arm assembly, the manipulator head engages at least one carton at a time from a carton pile resting on a floor for movement to the conveyor system,
    wherein the pivotal movement of the right and left lower arms maintains the upper arm axis at a height that enables the at least one carton to be conveyed by the conveyor system without being impeded by the robotic arm assembly, and
    wherein the mobile body comprises:
        at least one wheel; and
        a built-in jacking apparatus extendable from the mobile body to a floor to raise mobile body a distance sufficient to raise the at least one wheel away from contacting the floor.

2. The robotic carton unloader of claim 1, wherein:
    the at least one wheel comprises a steerable wheel; and
    the built-in jacking apparatus comprises a lower end having a skid surface and an actuating mechanism independent of power from the robotic carton unloader to raise the mobile body for pulling the robotic carton unloader backward in an unpowered state.

3. The robotic carton unloader of claim 1, wherein:
    the at least one wheel comprises a steerable wheel; and
    the built-in jacking apparatus comprises a lower end having a rolling surface and an actuating mechanism independent of power from the robotic carton unloader to raise the mobile body for pulling the robotic carton unloader backward in an unpowered state.

4. A robotic carton unloader for unloading a carton pile resting on a floor, comprising:
    a mobile body movable across the floor on more than one wheel;
    a conveyor system mounted on the mobile body to convey unloaded cartons thereon;
    a robotic arm assembly comprising a manipulator head attached to a front end of the upper arm assembly, the manipulator head engages at least one carton at a time from a carton pile resting on a floor for movement to the conveyor system; and
    a built-in jacking apparatus extendable from the mobile body to a floor to raise the mobile body a distance sufficient to raise at least one of the more than one wheel away from contacting the floor.

5. The robotic carton unloader of claim 4, wherein:
    the built-in jacking apparatus comprises a lower end having a skid surface and a first actuating mechanism independent of power from the robotic carton unloader to raise the mobile body for pulling the robotic carton unloader backward in an unpowered state.

6. The robotic carton unloader of claim 5, wherein:
    the built-in jacking apparatus further comprises a second actuating mechanism independent of power from the robotic carton unloader and that imparts a backward longitudinal movement to the mobile body that is raised by the first actuating mechanism.

7. The robotic carton unloader of claim 4, wherein:
    the built-in jacking apparatus comprises a lower end having a rolling surface and a first actuating mechanism independent of power from the robotic carton unloader to raise the mobile body for pulling the robotic carton unloader backward in an unpowered state.

8. The robotic carton unloader of claim 7, wherein:
    the built-in jacking apparatus further comprises a second actuating mechanism independent of power from the robotic carton unloader and that imparts a backward longitudinal movement to the mobile body that is raised by the first actuating mechanism.

* * * * *